(12) United States Patent
Turner et al.

(10) Patent No.: US 11,681,624 B2
(45) Date of Patent: Jun. 20, 2023

(54) SPACE AND TIME CACHE COHERENCY

(71) Applicant: QUALCOMM Incorporated, San Diego, CA (US)

(72) Inventors: Andrew Edmund Turner, San Diego, CA (US); Bohuslav Rychlik, San Diego, CA (US); George Patsilaras, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/931,490

(22) Filed: Jul. 17, 2020

(65) Prior Publication Data

US 2022/0019534 A1 Jan. 20, 2022

(51) Int. Cl.
*G06F 12/0815* (2016.01)
*G06F 12/0804* (2016.01)
*G06F 12/0891* (2016.01)
*G06F 12/10* (2016.01)

(52) U.S. Cl.
CPC ...... *G06F 12/0815* (2013.01); *G06F 12/0804* (2013.01); *G06F 12/0891* (2013.01); *G06F 12/10* (2013.01); *G06F 2212/1032* (2013.01); *G06F 2212/657* (2013.01)

(58) Field of Classification Search
CPC ............ G06F 12/0815; G06F 12/0804; G06F 12/0891; G06F 12/10; G06F 2212/1032; G06F 2212/657
See application file for complete search history.

(56) References Cited

U.S. PATENT DOCUMENTS

| | | | | |
|---|---|---|---|---|
| 8,370,576 | B1 * | 2/2013 | Favor | G06F 12/0855 |
| | | | | 711/146 |
| 9,542,316 | B1 * | 1/2017 | Forrest | G06F 12/0831 |
| 2004/0111552 | A1 * | 6/2004 | Arimilli | G06F 9/384 |
| | | | | 711/100 |
| 2004/0111591 | A1 * | 6/2004 | Arimilli | G06F 9/30123 |
| | | | | 712/228 |
| 2007/0186054 | A1 * | 8/2007 | Kruckemyer | G06F 12/082 |
| | | | | 711/144 |
| 2008/0133834 | A1 * | 6/2008 | Gaither | G06F 12/0813 |
| | | | | 711/E12.042 |
| 2014/0040552 | A1 * | 2/2014 | Rychlik | G06F 12/0815 |
| | | | | 711/122 |
| 2016/0062893 | A1 * | 3/2016 | Tune | G06F 12/0831 |
| | | | | 711/146 |
| 2018/0032435 | A1 * | 2/2018 | Parker | G06F 12/10 |
| 2020/0119753 | A1 * | 4/2020 | Ch, I | H03M 13/2785 |

* cited by examiner

*Primary Examiner* — Prasith Thammavong
(74) *Attorney, Agent, or Firm* — The Marbury Law Group/Qualcomm

(57) ABSTRACT

Various embodiments include methods and devices for virtual cache coherency. Embodiments may include receiving a snoop for a physical address from a coherent processing device, determining whether an entry for the physical address corresponding to a virtual address in a virtual cache exists in a snoop filter, and sending a cache coherency operation to the virtual cache in response to determining that the entry exists in the snoop filter.

28 Claims, 18 Drawing Sheets

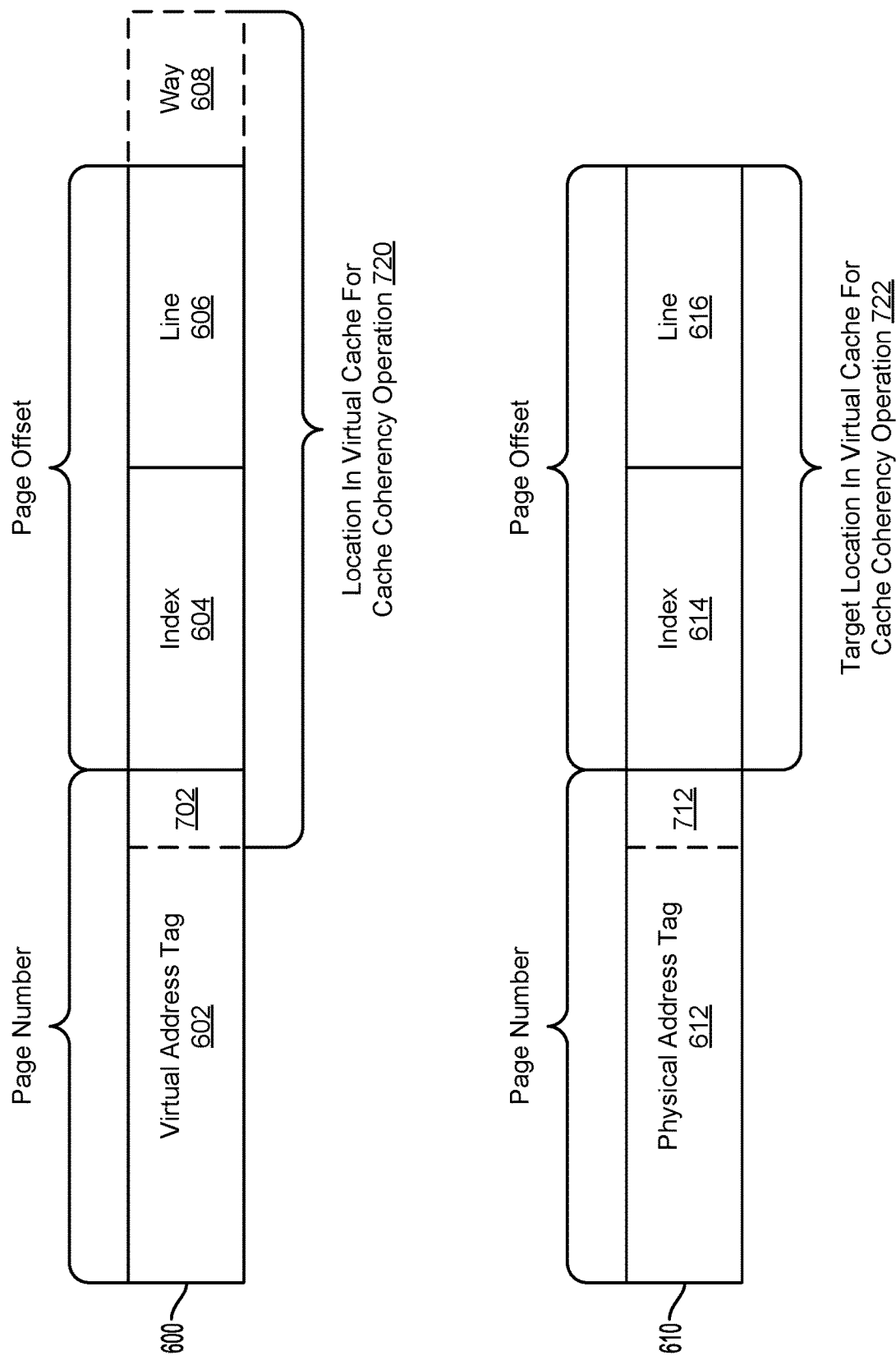

SPACE AND TIME CACHE COHERENCY

BACKGROUND

Processing device cores other than central processing units, such as graphics processing units and digital signal processors, often implement virtual cache memory. Full cache coherency is a desirable feature for heterogeneous computing using different types of processing devices. A traditional means for providing full cache coherency for heterogeneous computing is to have a memory management unit (MMU) on a critical path to the lowest level caches. The MMU on the critical path adds cost, such as increased latency and constrained bandwidth, complexity, such as support for parallel MMU lookups, tracking of coherency state, implementing and verifying coherency state finite state machines, coherent bus implementation with bi-directional snooping, timely snoop responses to avoid bottlenecks, and can result in over-invalidation of cache lines when not required for coherency.

SUMMARY

Various disclosed aspects may include apparatuses and methods for virtual cache coherency. Various aspects may include receiving a snoop for a physical address from a coherent processing device, determining whether an entry for the physical address corresponding to a virtual address in a virtual cache exists in a snoop filter, and sending a cache coherency operation to the virtual cache in response to determining that the entry exists in the snoop filter.

Some aspects may further include receiving the cache coherency operation, and implementing the cache coherency operation in the virtual cache.

Some aspects may further include sending virtual cache location information for the cache coherency operation in response to determining that the entry exists in the snoop filter, and receiving virtual cache location information for the cache coherency operation, in which implementing the cache coherency operation in the virtual cache may include implementing the cache coherency operation in the virtual cache at locations corresponding with the virtual cache location information.

In some aspects, the virtual cache location information may be stored in the entry for the physical address in the snoop filter.

In some aspects, the virtual cache location information may be at least part of the physical address.

Some aspects may further include receiving a release synchronization operation command, setting a synchronization status for a line in the virtual cache to need to flush in response to receiving the release synchronization operation command, determining whether the synchronization status for the line is set to need to flush, and determining whether the cache coherency operation is a flush operation. In such aspects, implementing the cache coherency operation in the virtual cache may include flushing the line in response to determining that the synchronization status for the line is set to need to flush and in response to determining that the cache coherency operation is a flush operation.

In some aspects, receiving the cache coherency operation may include receiving an invalidate operation. Such aspects may further include setting a synchronization status for a line in the virtual cache to need to flush in response to receiving the invalidate operation, receiving an acquire synchronization operation command, and determining whether the synchronization status for the line is set to need to invalidate. In such aspects, implementing the cache coherency operation in the virtual cache may include invalidating the line in response to receiving the invalidate operation acquire synchronization operation command and in response to determining that the synchronization status for the line is set to need to invalidate.

Some aspects may further include receiving the physical address and a portion of the corresponding virtual address from a system memory management unit (SMMU), updating a counter of the entry configured to track a number of lines in the virtual cache having a location including the portion of the corresponding virtual address, determining whether the counter indicates that the there are no lines in the cache for the entry having a location including the portion of the corresponding virtual address, and removing the entry from the snoop filter in response to determining that the counter indicates that the there are no lines in the cache for the entry having a location including the portion of the corresponding virtual address.

Some aspects may further include setting a version identifier (ID) of the virtual cache for a type of cache coherency operation, and setting a version ID of a line of the virtual cache for a type of a cache coherency operation.

Some aspects may further include receiving a synchronization operation, and determining a type of the synchronization operation, in which setting a version ID of the virtual cache for a type of cache coherency operation may include advancing the version ID for the virtual cache for a type of cache coherency operation based on the type of synchronization operation.

Some aspects may further include receiving a cache coherency operation, determining a type of the cache coherency operation, determining whether the version ID for the line in the virtual cache is older than the version ID for the virtual cache, flushing the line in the virtual cache in response to determining that the type of the cache coherency operation is a flush operation and that the version ID for the line in the virtual cache is older than the version ID for the virtual cache, and determining whether the version ID for the line in the virtual cache is unset, in which setting a version ID of a line of the virtual cache for a type of a cache coherency operation may include setting the version ID for the line in the virtual cache to the version ID of the virtual cache in response to determining that the type of the cache coherency operation is an invalidate operation and that the version ID for the line in the virtual cache is unset.

Some aspects may further include receiving a cache operation, determining a type of the cache operation, determining whether the version ID for the line in the virtual cache is older than the version ID for the virtual cache, missing and fetching data for the line in the virtual cache in response to determining that the type of the cache operation is a read operation and that the version ID for the line in the virtual cache is older than the version ID for the virtual cache, and determining whether the version ID for the line in the virtual cache is unset, in which setting a version ID of a line of the virtual cache for a type of a cache coherency operation may include setting the version ID for the line in the virtual cache to the version ID of the virtual cache in response to determining that the type of the cache operation is a write operation and that the version ID for the line in the virtual cache is unset.

Further aspects include a computing device having a processor configured to perform operations of any of the methods summarized above. Further aspects include a computing device having means for performing functions of any of the methods summarized above. Further aspects include a non-transitory processor-readable medium having stored thereon processor-executable instructions configured to cause a processor and other components of a computing device to perform operations of any of the methods summarized above.

BRIEF DESCRIPTION OF THE DRAWINGS

The accompanying drawings, which are incorporated herein and constitute part of this specification, illustrate example embodiments of various embodiments, and together with the general description given above and the detailed description given below, serve to explain the features of the claims.

FIG. 7 is a block diagram illustrating examples of a virtual cache address and a physical cache address for use in a virtual cache coherency system with correspondence between lines in a virtual cache and entries for lines in a snoop filter suitable for implementing various embodiments.

DETAILED DESCRIPTION

Figure 1:
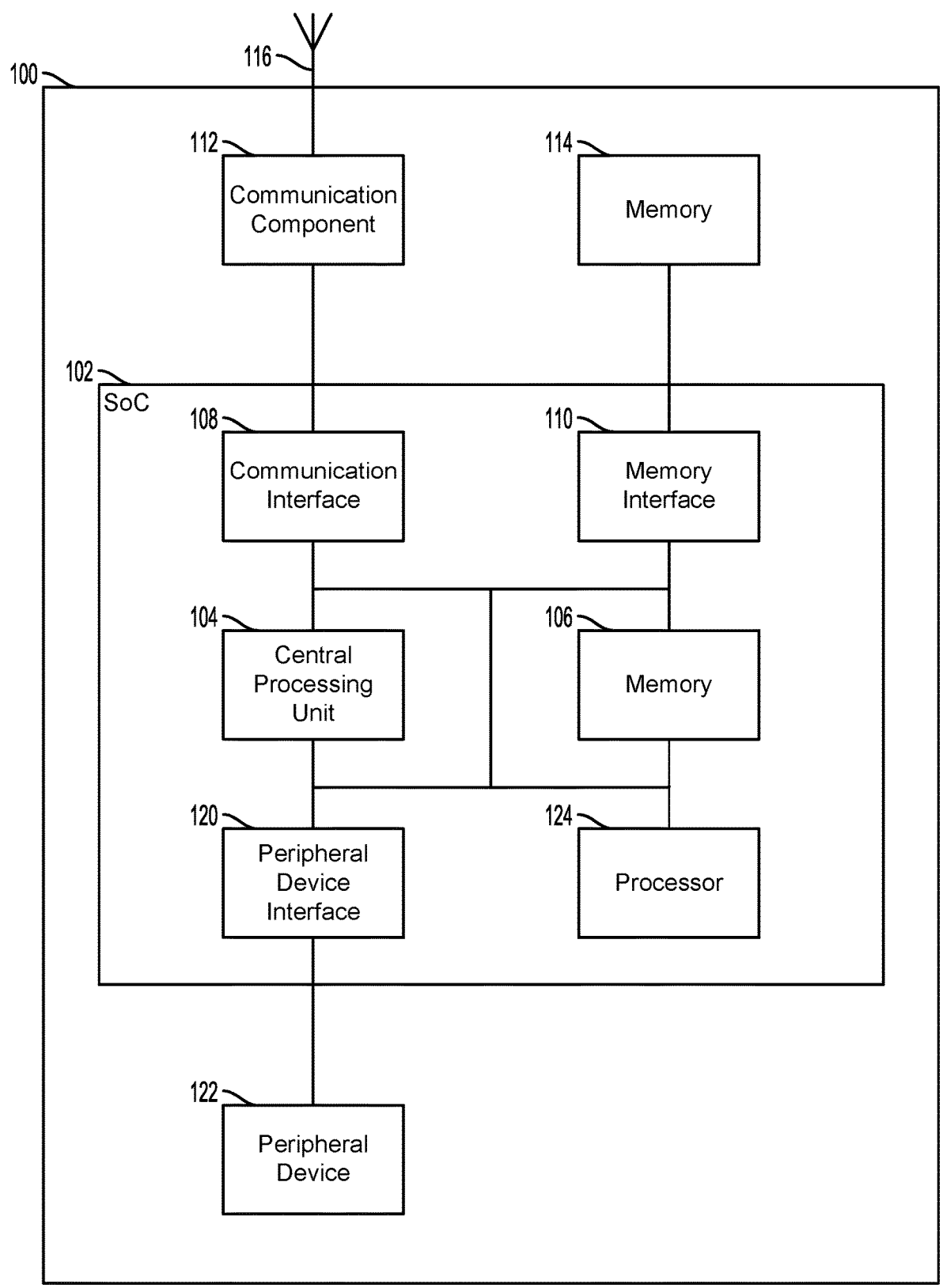
FIG. 1 is a component block diagram illustrating an example computing device suitable for implementing various embodiments.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

Various embodiments include methods, and computing devices implementing such methods for managing space and time cache coherency. Some embodiments may include a snoop filter configured to manage snoops and cache coherency operations for a virtual cache of a first processing device in response to a snoop of the virtual cache from a second processing device. In some embodiments, the snoop filter may determine whether a snooped line is in a virtual cache and send a cache coherency operation to the virtual cache in response to the snooped line is in the virtual cache. In some embodiments, the virtual cache may implement a cache coherency operation in response to receiving the cache coherency operation from the snoop filter. In some embodiments, the virtual cache may implement a cache coherency operation in response to receiving the cache coherency operation from the snoop filter and receiving a synchronization signal from the first processing device. In some embodiments, the snoop filter may be configured to send cache coherency operations for the entire virtual cache. In some embodiments, the snoop filter may be configured to use coherency and/or aliasing to send cache coherency operations for lines in a set in the virtual cache. In some embodiments, the snoop filter may be configured to use coherency and/or aliasing to send cache coherency operations for lines in a way of a set the virtual cache and/or for specific lines in a way of a set and/or in a set of the virtual cache.

The terms "computing device" and "mobile computing device" are used interchangeably herein to refer to any one or all of cellular telephones, smartphones, personal or mobile multi-media players, personal data assistants (PDA's), laptop computers, tablet computers, convertible laptops/tablets (2-in-1 computers), smartbooks, ultrabooks, netbooks, palm-top computers, wireless electronic mail receivers, multimedia Internet enabled cellular telephones, mobile gaming consoles, wireless gaming controllers, and similar personal electronic devices that include a memory, and a programmable processor. The term "computing device" may further refer to stationary computing devices including personal computers, desktop computers, all-in-one computers, workstations, super computers, mainframe computers, embedded computers (such as in vehicles and other larger systems), servers, multimedia computers, and game consoles.

Implementing cache coherency in computing using multiple processing devices including a processing device with a virtual cache generally involves having a memory management unit (MMU) on a critical path to the lowest level caches. The MMU on the critical path adds cost, such as increased latency and constrained bandwidth, complexity, such as support for parallel MMU lookups, tracking of coherency state, implementing and verifying coherency state finite state machines, coherent bus implementation with bi-directional snooping, timely snoop responses to avoid bottlenecks, and can result in over-invalidation of cache lines when not required for coherency.

In some instances, on demand cache coherency has been implemented, such as described in U.S. Pat. No. 9,218,289, the entirety of which is incorporated herein by reference.

The embodiments described herein solve the foregoing problem of using an MMU on the critical path to the lowest level caches for cache coherency in computing using virtual cache by providing a snoop filter to manage snoops and cache coherency operations for a virtual cache in response to a snoop of the virtual cache. For example, the embodiments described herein improve the accuracy of the cache coherency operations on the virtual cache by reducing the removal of valid lines from the virtual cache. This improvement may be particularly useful, for example, in situations in which data is shared between processing devices, such as a central processing unit and a processing device other than a central processing unit, progressively in blocks. For example, when using pipelining a central processing unit can write a number of data blocks, and the processing device can use some of those data blocks.

Generally, a cache coherency operation for the central processing unit to load a new data block requires that the data blocks used by the processing device, i.e., in the virtual memory of the processing device, be replaced. However, frequently, the new data block is not shared with the processing device, i.e., not in the virtual cache, and replacing the data blocks used by the processing device is unnecessary. Various embodiments described herein do not need to include the MMU on the critical path to the lowest level caches, and do not require tracking of coherency states of individual lines in the virtual cache and the associated machinery to implement such tracking. Various embodiments described herein also avoid implementing cache coherency operations for lines not in the virtual cache.

In some embodiments, a snoop filter may be implemented to receive snoops of physical addresses of lines of physical caches and determine whether the snooped lines of physical caches are shared with the processing device by being in the virtual cache. The snoop filter may determine whether the snooped lines of the physical caches are in the virtual cache by comparing physical address tags of the physical addresses, received as part of the snoops, with physical address tags in the snoop filter. The snoop filter may send cache coherency operations in response to determining that the snooped lines of the physical caches are in the virtual cache, and may prevent sending of the cache coherency operations in response to determining that the snooped lines of the physical caches are not in the virtual cache. In some embodiments, the cache coherency operations may be for the entire virtual cache. By managing when to send cache coherency operations, the snoop filter may filter cache coherency operations that may not need to be implemented in the virtual cache because the snooped lines are not in the virtual cache. Similarly, the snoop filter preventing unnecessary cache coherency operations in the virtual cache may allow the virtual cache to delay cache coherency operations until lines are evicted and/or fetched based on policies of the virtual cache or requests from the processing device.

In some embodiments, the snoop filter may be integrated with a physical cache, such as an L2 cache, of the processing device. The snoop filter and the physical cache may share physical address tags that correspond to lines in the virtual cache and coherency mechanisms. Integrating the snoop filter with the physical cache can reduce the area used on a chip, such as a system on chip, used to implement the snoop filter. Integrating the snoop filter with the physical cache can also enable the snoop filter to respond with data to read snoops for clean lines and to quickly reload invalidated date from closer upper level caches.

In some embodiments, the snoop filter may implement correspondence between lines in the virtual cache and entries for lines in the snoop filter. The snoop filter may implement correspondence by storing index, line, way, and/or portions of virtual address tag information for the lines in the virtual cache in association with the physical address tag information for the lines. In some embodiments, the snoop filter may implement correspondence by using index and/or line information of the snoops of the virtual cache. Correspondence may map any number of lines in the virtual cache to entries in the snoop filter, such as 1:N mappings in which one snoop filter entry is mapped to "N" lines in the virtual cache, where N may be any integer greater than or equal to one. In some embodiments, the snoop filter may send the cache coherency operations to the virtual cache for the lines in the virtual cache corresponding to the physical address tags of the snoops and having the index, line, way, and/or portions of virtual address tag information associated with the physical address tags in the snoop filter and/or having the index and/or line information of the snoops. Implementing correspondence in the snoop filter can reduce overfitting the cache coherence operations to the entire virtual cache by specifying certain, sets, ways, and/or lines of the virtual cache for which to implement the cache coherence operations.

In some embodiments, the snoop filter may implement aliasing of lines of the virtual cache in the snoop filter. Aliasing may be implemented via known means, such as page table aliasing, and/or correspondence. Counters may be added to the snoop filter entries to track the number of aliased lines in the virtual cache for the snoop filter entries. The counters may further be configured to track the number of lines that meet certain conditions, such as lines having the same index information and/or lines in the same way. Initialization of the counters and/or increase the number of aliased lines in the virtual cache for the snoop filter entries may result from allocation of lines in the virtual cache. Snoop filter entries may be removed in response to associated counters indicating that there are no aliased lines in the virtual cache for the snoop filter entries. Reduction in the number of aliased lines in the virtual cache for the snoop filter entries may result from policy based eviction of the lines in the virtual cache. Overflow of the counters may cause the snoop filter to transition to removing snoop filter entries in response to implementation of cache coherence operations in the virtual cache. The counters may be cleared in response to removal of associated aliased lines from the virtual cache. Implementing aliasing may avoid implementing cache coherency operations for lines not in the virtual cache.

In some embodiments, whether the virtual cache implements a cache coherency operation received from the snoop filter may depend on whether a synchronization status bit is set in response to a synchronization operation from the processing device. The virtual cache may be configured to implement cache coherency operations when a specific cache coherency operation is received while a specific status is indicated by the synchronization status bit. Otherwise, the virtual cache may be configured to avoid implementing the received cache coherency operation.

FIG. 1 illustrates a system including a computing device 100 suitable for use with various embodiments. The computing device 100 may include an SoC 102 with a central processing unit 104, a memory 106, a communication interface 108, a memory interface 110, a peripheral device interface 120, and a processing device 124. The computing device 100 may further include a communication component 112, such as a wired or wireless modem, a memory 114, an antenna 116 for establishing a wireless communication link, and/or a peripheral device 122. The processor 124 may include any of a variety of processing devices, for example a number of processor cores.

The term "system-on-chip" or "SoC" is used herein to refer to a set of interconnected electronic circuits typically, but not exclusively, including a processing device, a memory, and a communication interface. A processing device may include a variety of different types of processors 124 and/or processor cores, such as a general purpose processor, a central processing unit (CPU) 104, a digital signal processor (DSP), a graphics processing unit (GPU), an accelerated processing unit (APU), a secure processing unit (SPU), an intellectual property unit (IPU), a subsystem processor of specific components of the computing device, such as an image processor for a camera subsystem or a display processor for a display, an auxiliary processor, a peripheral device processor, a single-core processor, a multicore processor, a controller, and/or a microcontroller. A processing device may further embody other hardware and hardware combinations, such as a field programmable gate array (FPGA), an application-specific integrated circuit (ASIC), other programmable logic device, discrete gate logic, transistor logic, performance monitoring hardware, watchdog hardware, and/or time references. Integrated circuits may be configured such that the components of the integrated circuit reside on a single piece of semiconductor material, such as silicon.

An SoC 102 may include one or more CPUs 104 and processors 124. The computing device 100 may include more than one SoC 102, thereby increasing the number of CPUs 104, processors 124, and processor cores. The computing device 100 may also include CPUs 104 and processors 124 that are not associated with an SoC 102. Individual CPUs 104 and processors 124 may be multicore processors. The CPUs 104 and processors 124 may each be configured for specific purposes that may be the same as or different from other CPUs 104 and processors 124 of the computing device 100. One or more of the CPUs 104, processors 124, and processor cores of the same or different configurations may be grouped together. A group of CPUs 104, processors 124, or processor cores may be referred to as a multiprocessor cluster.

The memory 106 of the SoC 102 may be a volatile or non-volatile memory configured for storing data and processor-executable code for access by the CPU 104, the processor 124, or other components of SoC 102. The computing device 100 and/or SoC 102 may include one or more memories 106 configured for various purposes. One or more memories 106 may include volatile memories such as random access memory (RAM) or main memory, or cache memory. These memories 106 may be configured to temporarily hold a limited amount of data received from a data sensor or subsystem, data and/or processor-executable code instructions that are requested from non-volatile memory, loaded to the memories 106 from non-volatile memory in anticipation of future access based on a variety of factors, and/or intermediary processing data and/or processor-executable code instructions produced by the CPU 104 and/or processor 124 and temporarily stored for future quick access without being stored in non-volatile memory. In some embodiments, any number and combination of memories 106 may include one-time programmable or read-only memory.

The memory 106 may be configured to store data and processor-executable code, at least temporarily, that is loaded to the memory 106 from another memory device, such as another memory 106 or memory 114, for access by one or more of the CPU 104, the processor 124, or other components of SoC 102. The data or processor-executable code loaded to the memory 106 may be loaded in response to execution of a function by the CPU 104, the processor 124, or other components of SoC 102. Loading the data or processor-executable code to the memory 106 in response to execution of a function may result from a memory access request to the memory 106 that is unsuccessful, or a "miss," because the requested data or processor-executable code is not located in the memory 106. In response to a miss, a memory access request to another memory 106 or memory 114 may be made to load the requested data or processor-executable code from the other memory 106 or memory 114 to the memory 106. Loading the data or processor-executable code to the memory 106 in response to execution of a function may result from a memory access request to another memory 106 or memory 114, and the data or processor-executable code may be loaded to the memory 106 for later access.

The memory interface 110 and the memory 114 may work in unison to allow the computing device 100 to store data and processor-executable code on a volatile and/or non-volatile storage medium, and retrieve data and processor-executable code from the volatile and/or non-volatile storage medium. The memory 114 may be configured much like an embodiment of the memory 106 in which the memory 114 may store the data or processor-executable code for access by one or more of the CPU 104, the processor 124, or other components of SoC 102. In some embodiments, the memory 114, being non-volatile, may retain the information after the power of the computing device 100 has been shut off. When the power is turned back on and the computing device 100 reboots, the information stored on the memory 114 may be available to the computing device 100. In some embodiments, the memory 114, being volatile, may not retain the information after the power of the computing device 100 has been shut off. The memory interface 110 may control access to the memory 114 and allow the CPU 104, the processor 124, or other components of the SoC 12 to read data from and write data to the memory 114.

Some or all of the components of the computing device 100 and/or the SoC 102 may be arranged differently and/or combined while still serving the functions of the various embodiments. The computing device 100 may not be limited to one of each of the components, and multiple instances of each component may be included in various configurations of the computing device 100.

Figure 2:
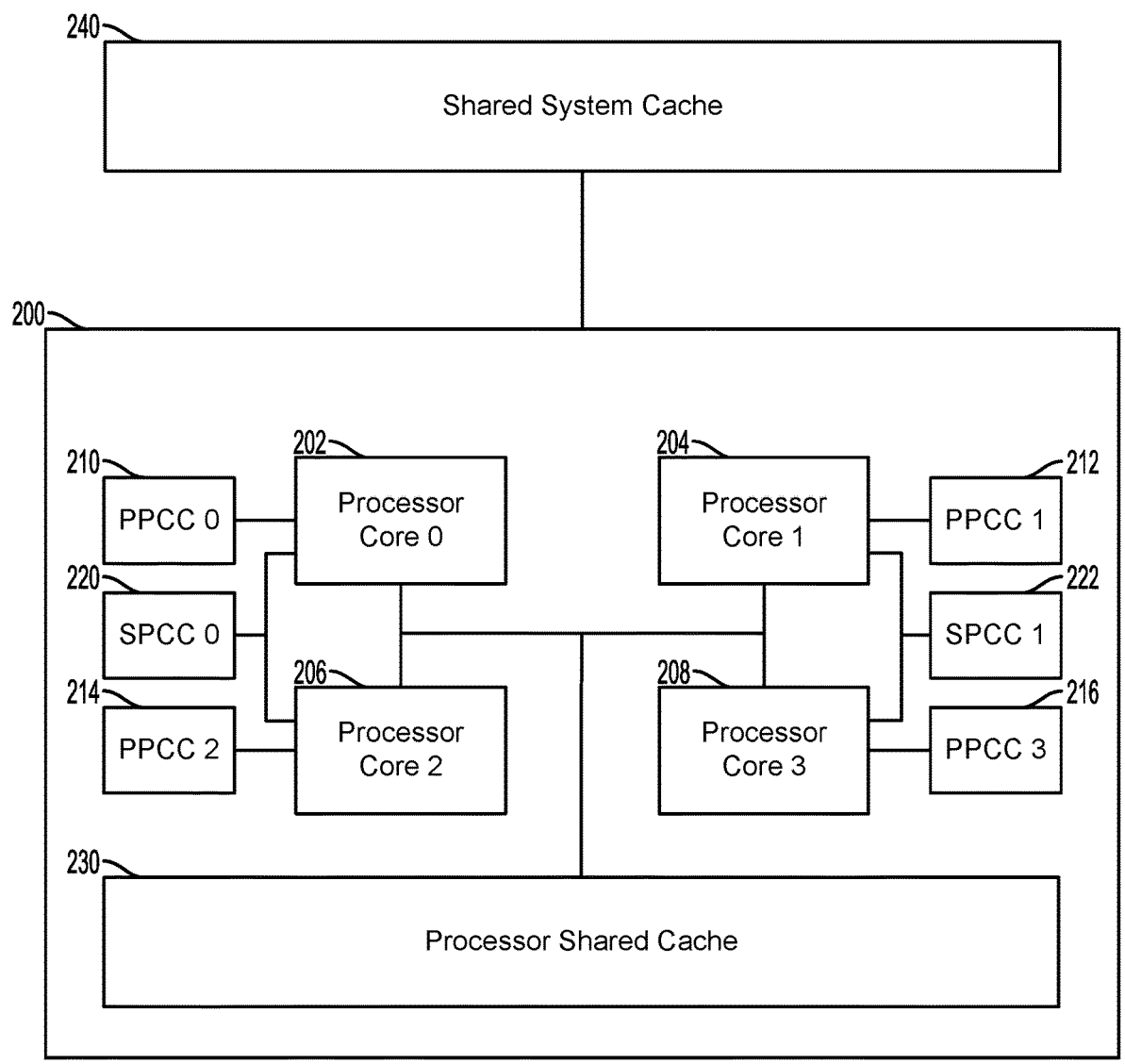
FIG. 2 is a component block diagram illustrating example processing device suitable for implementing various embodiments.

FIG. 2 illustrates components of a computing device (e.g., computing device 100 in FIG. 1) suitable for implementing an embodiment. With reference to FIG. 1, a processor 200 (e.g., central processing unit 104, processor 124 in FIG. 1) may include multiple processor types, including, for example, a CPU and various hardware accelerators, such as a GPU, a DSP, an SPU, an APU, an IPU, a subsystem processor of specific components of the computing device, an auxiliary processor, a peripheral device processor, controllers/microcontrollers, etc. The processor 200 may also include a custom hardware accelerator, which may include custom processing hardware and/or general purpose hardware configured to implement a specialized set of functions.

The processors 200 may include any number of processor cores 202, 204, 206, 208. A processor 200 having multiple processor cores 202, 204, 206, 208 may be referred to as a multicore processor.

The processor 200 may have a plurality of homogeneous or heterogeneous processor cores 202, 204, 206, 208. A homogeneous processor may include a plurality of homogeneous processor cores. The processor cores 202, 204, 206, 208 may be homogeneous in that, the processor cores 202, 204, 206, 208 of the processor 200 may be configured for the same purpose and have the same or similar performance characteristics. For example, the processor 200 may be a general purpose processor, and the processor cores 202, 204, 206, 208 may be homogeneous general purpose processor cores. The processor 200 may be a GPU or a DSP, and the processor cores 202, 204, 206, 208 may be homogeneous graphics processor cores or digital signal processor cores, respectively. The processor 200 may be a custom hardware accelerator with homogeneous processor cores 202, 204, 206, 208.

A heterogeneous processor may include a plurality of heterogeneous processor cores. The processor cores 202, 204, 206, 208 may be heterogeneous in that the processor cores 202, 204, 206, 208 of the processor 200 may be configured for different purposes and/or have different performance characteristics. The heterogeneity of such heterogeneous processor cores may include different instruction set architecture, pipelines, operating frequencies, etc. An example of such heterogeneous processor cores may include what are known as "big.LITTLE" architectures in which slower, low-power processor cores may be coupled with more powerful and power-hungry processor cores. In similar embodiments, an SoC (for example, SoC 122 of FIG. 1) may include any number of homogeneous or heterogeneous processors 200. In various embodiments, not all off the processor cores 202, 204, 206, 208 need to be heterogeneous processor cores, as a heterogeneous processor may include any combination of processor cores 202, 204, 206, 208 including at least one heterogeneous processor core.

Each of the processor cores 202, 204, 206, 208 of a processor 200 may be designated a private processor core cache (PPCC) memory 210, 212, 214, 216 that may be dedicated for read and/or write access by a designated processor core 202, 204, 206, 208. The private processor core cache 210, 212, 214, 216 may store data and/or instructions, and make the stored data and/or instructions available to the processor cores 202, 204, 206, 208, to which the private processor core cache 210, 212, 214, 216 is dedicated, for use in execution by the processor cores 202, 204, 206, 208. The private processor core cache 210, 212, 214, 216 may include volatile memory. The private processor core cache 210, 212, 214, 216 may a physical cache and/or a virtual cache.

Groups of the processor cores 202, 204, 206, 208 of a processor 200 may be designated a shared processor core cache (SPCC) memory 220, 222 that may be dedicated for read and/or write access by a designated group of processor core 202, 204, 206, 208. The shared processor core cache 220, 222 may store data and/or instructions, and make the stored data and/or instructions available to the group processor cores 202, 204, 206, 208 to which the shared processor core cache 220, 222 is dedicated, for use in execution by the processor cores 202, 204, 206, 208 in the designated group. The shared processor core cache 220, 222 may include volatile memory.

The processor 200 may include a shared processor cache memory 230 that may be dedicated for read and/or write access by the processor cores 202, 204, 206, 208 of the processor 200. The shared processor cache 230 may store data and/or instructions, and make the stored data and/or instructions available to the processor cores 202, 204, 206, 208, for use in execution by the processor cores 202, 204, 206, 208. The shared processor cache 230 may also function as a buffer for data and/or instructions input to and/or output from the processor 200. The shared cache 230 may include volatile memory.

Multiple processors 200 may access a shared system cache memory 240 (e.g., memory 106 in FIG. 1) that may be dedicated for read and/or write access by the processor cores 202, 204, 206, 208 of the multiple processors 200. The shared system cache 240 may store data and/or instructions and make the stored data and/or instructions available to the processor cores 202, 204, 206, 208, for use in execution by the processor cores 202, 204, 206, 208. The shared system cache 240 may also function as a buffer for data and/or instructions input to and/or output from the multiple processors 200. The shared system cache 240 may include volatile memory.

The example illustrated in FIG. 2 showing the four processor cores 202, 204, 206, 208, the four private processor core caches 210, 212, 214, 216, two groups of processor cores 202, 204, 206, 208 and the shared processor core caches 220, 222, the one processor shared cache 220, and the one shared system cache 240 is not meant to limit the various embodiments to these specific numbers of components. The computing device 100, the SoC 102, or the processor 200 may individually or in combination include fewer or more than the four processor cores 202, 204, 206, 208, four private processor core caches 210, 212, 214, 216, and two shared processor core caches 220, 222, one processor shared cache 220, and/or one shared system cache 240 as illustrated and described herein.

For ease of reference, the terms "processor," "multicore processor," "processor core," "controller," and "microcontroller" may be used interchangeably herein. The descriptions herein of the illustrated computing device and its various components are only meant to be exemplary and not to be limiting. Several of the components of the illustrated example computing device may be variably configured, combined, and separated. Several of the components may be included in greater or fewer numbers and may be located and connected differently within the SoC or separate from the SoC.

Figure 3:
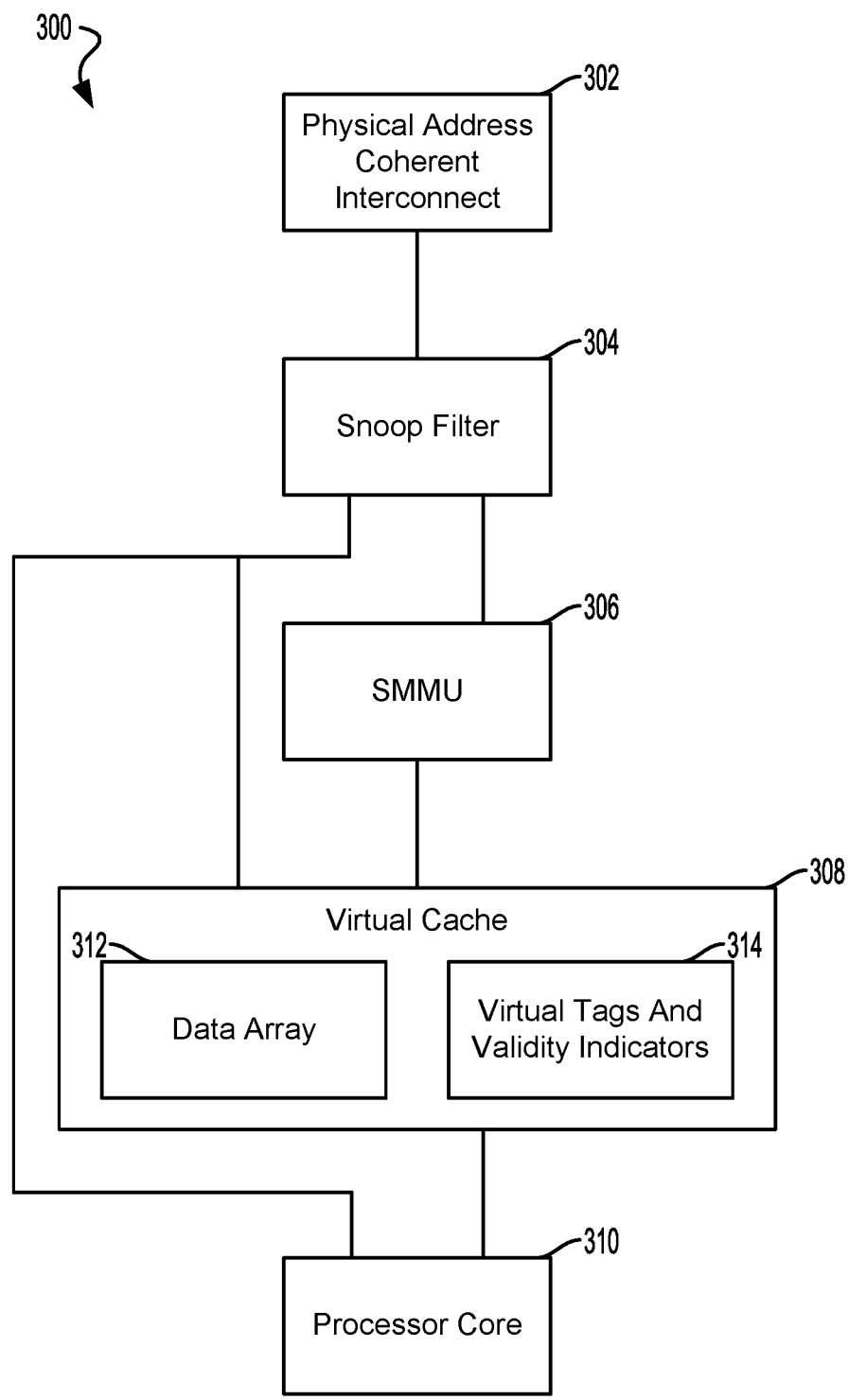
FIG. 3 is a component block diagram illustrating an example virtual cache coherency system suitable for implementing various embodiments.
Figure 4:
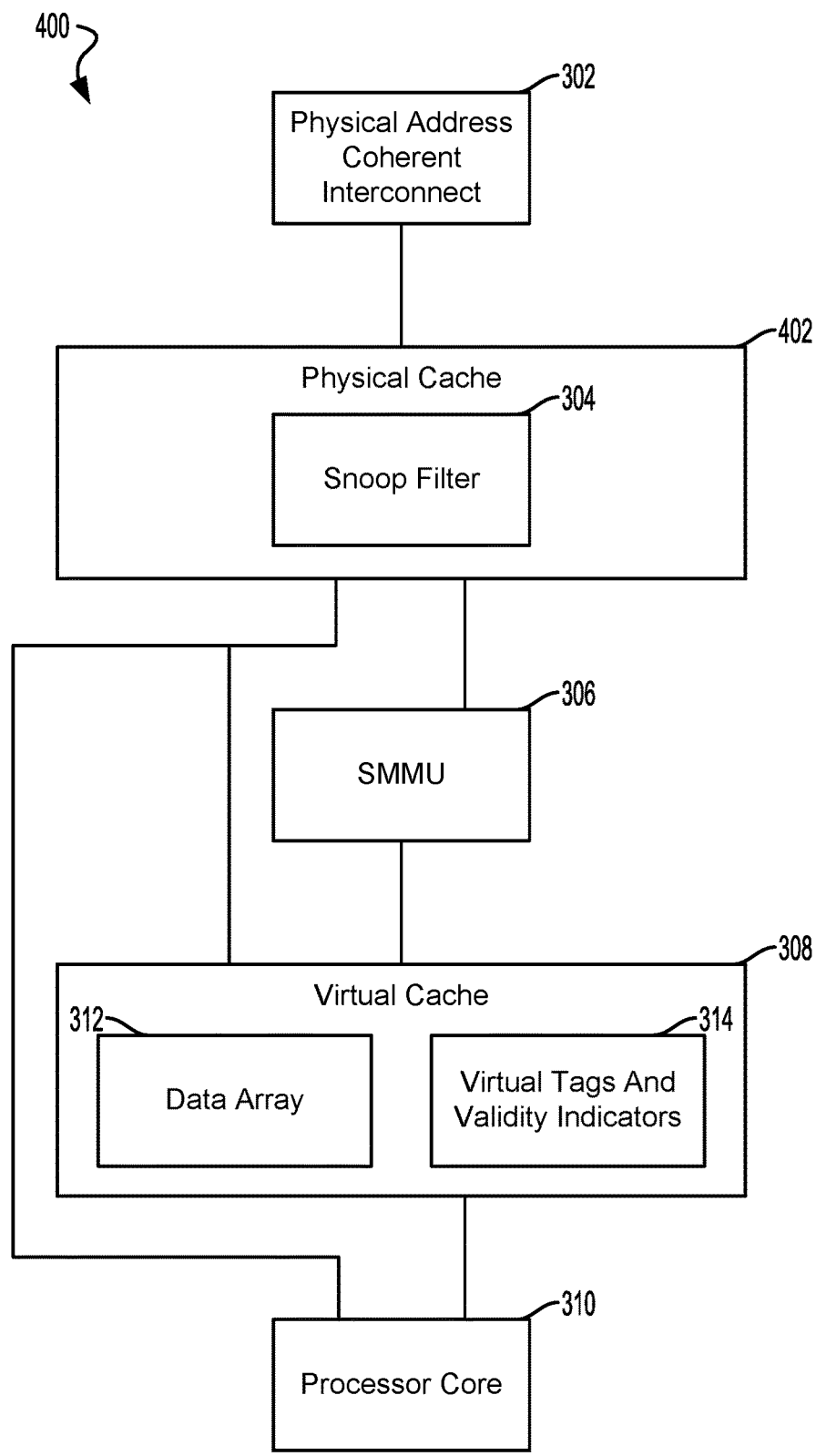
FIG. 4 is a component block diagram illustrating an example virtual cache coherency system suitable for implementing various embodiments.

FIGS. 3 and 4 illustrate examples of virtual cache coherency systems suitable for implementing various embodiments. With reference to FIGS. 1 and 2, the virtual cache coherency systems 300, 400 may include a physical address coherent interconnect 302, a snoop filter 304, a system memory management unit (SMMU) 306, a virtual cache 308 (e.g., private processor core cache 210, 212, 214, 216 in FIG. 2), and a processor core 310 (e.g., CPU 104, processor 124 in FIG. 1, processor core 202, 204, 206, 208 in FIG. 2).

The physical address coherent interconnect 302 may be configured to receive snoops of the virtual cache 308 from processing devices (e.g., CPU 104, processor 124 in FIG. 1, processor 200, processor core 202, 204, 206, 208 in FIG. 2) (not shown). The physical address coherent interconnect 302 may be configured to transmit the received snoops from the processing devices to snoop filter 304.

The snoop filter 304 may be configured to store entries indicating whether lines of data from physical caches (e.g., private processor core cache 210, 212, 214, 216, shared processor core cache 220, 222, processor shared cache 220, shared system cache 240 in FIG. 2) used by the processing devices are stored in the virtual cache 308. In some embodiments the entries in the snoop filter 304 may include physical address tag portions of physical addresses of the lines in the physical caches. In some embodiments, the entries in the snoop filter 304 may further include index, line, way, and/or portions of virtual address tag information, which may be used to implement correspondence between lines in the virtual cache 308 and entries for lines in the snoop filter 304, as described further herein. In some embodiments, the entries in the snoop filter 304 may further include aliasing counters configured to track a number of aliased lines in the virtual cache 308 for the snoop filter entries. The aliasing counters may further be configured to track a number of aliased lines in the virtual cache 308 that meet certain conditions, such as lines having the same index information and/or lines in the same way. The snoop filter 304 may be configured to receive information for the entries in the snoop filter from the SMMU 306, as described further herein. In some embodiments, the snoop filter 304 may be configured as a bloom filter.

The snoop filter 304 may be further configured to receive snoops from the physical address coherent interconnect 302 and determine whether lines indicated for the snoops are in the virtual cache 308. The snoops may include physical addresses for the lines of the snoops corresponding to locations of the lines in the physical caches. The snoop filter 304 may compare parts of the physical addresses for the lines of the snoops to the entries in the snoop filter 304. For example, the snoop filter 304 may compare physical address tags of the physical addresses for the lines of the snoops with physical address tags of entries in the snoop filter 304 for the lines in the virtual cache 308. The snoop filter 304 may determine that lines of the snoops are in the virtual cache, for example, by matching the physical address tags of the physical addresses for the lines of the snoops with physical address tags of entries in the snoop filter 304. In response to determining that the lines of the snoops are in the virtual cache 308, the snoop filter 304 may send cache coherency operations to the virtual cache 308. In response to determining that the lines of the snoops are not in the virtual cache 308, the snoop filter 304 may prevent and/or avoid sending cache coherency operations to the virtual cache 308. The cache coherency operations may include invalidate and/or flush cache coherency operations. In some embodiments, the cache coherency operations may be for the entire virtual cache 308. In some embodiments, such as embodiments implementing correspondence between lines in the virtual cache 308 and entries for lines in the snoop filter 304, the cache coherency operations may be for specific lines, sets, and/or ways in the virtual cache 308.

The processor core 310 may read data from and/or write data to the virtual cache 308. The virtual cache 308 may store the data as lines at virtual addresses for each of the lines in the virtual cache 308. As described further herein, the virtual addresses may include virtual address tag, index, and/or line information. In some embodiments, locations of the lines in the virtual cache 308 may include way information. The virtual cache 308 may store the lines in a data array 312 of the virtual cache 308. The virtual cache 308 may further store the virtual address tags and validity indicators for the data of the lines in a separate portion 314 in the virtual cache. The virtual address tags and the validity indicators may be stored in a manner that associates the virtual address tags and the validity indicators with the lines in the virtual cache 308. The virtual address tags may be configured to uniquely identify lines in certain areas of the virtual cache 308, such as the entire virtual cache 308, sets of the virtual cache 308, and/or sets and ways of the virtual cache 308.

The virtual cache 308 may further receive cache coherency operations from the snoop filter and implement the cache coherency operations. In some embodiments, the virtual cache 308 may implement the cache coherency operations for the entire virtual cache 308. In some embodiments, the cache coherency operations may specify set index, line, way, and/or portions of virtual tag information for lines in the virtual cache 308 for which to perform the cache coherency operations. The virtual cache 308 may implement the cache coherency operations for lines in the virtual cache 308 that correspond with the set index, line, way, and/or portions of virtual tag information for lines in the virtual cache 308. In some embodiments, the cache coherency operations the virtual cache may implement may include to invalidate and/to flush and invalidate the lines in the virtual cache 308. In response to cache coherency operations for invalidating lines in the virtual cache 308, the virtual cache 308 may also set the validity indicators for the cache lines to indicate to the snoop filter 304 that the lines are invalid.

Storage, modification, and/or eviction of the lines in the virtual cache 308 may trigger the virtual cache 308 to indicate changes to the lines to the SMMU 306. The virtual cache 308 may transmit the virtual addresses and/or way information of the stored, modified, and/or evicted lines in the virtual cache 308 and/or the validity indicators of the lines to the SMMU 306. The SMMU 306 may be configured to translate the virtual addresses to physical addresses, for example by converting the virtual address tags of the virtual addresses to physical address tags of physical addresses. Translating the virtual addresses to physical addresses may include translating the virtual addresses of lines in the virtual cache 308 to corresponding physical addresses of the lines in the physical caches. The SMMU 306 may transmit the physical addresses and/or the validity indicators to the snoop filter 304. In some embodiments, the SMMU 306 may further transmit portions of the virtual address tags and/or way information for the lines in the virtual cache 308 to the snoop filter 304.

The snoop filter 304 may use the physical addresses and/or the validity indicators received from the SMMU 306 to create, update, and/or remove entries in the snoop filter 304 for the lines in the virtual cache 308. For example, physical addresses for lines in the virtual cache 308 and validity indicators indicating to the snoop filter 304 that the lines are valid may trigger the snoop filter 304 to create entries for the lines in response to no entries corresponding to the physical addresses existing in the snoop filter 304. Physical addresses for lines in the virtual cache 308 and validity indicators indicating to the snoop filter 304 that the lines are valid may trigger the snoop filter 304 to update entries for the lines in response to entries corresponding to the physical addresses existing in the snoop filter 304. Physical addresses for lines in the virtual cache 308 and validity indicators indicating to the snoop filter 304 that the lines are invalid may trigger the snoop filter 304 to remove entries for the lines in response to entries corresponding to the physical addresses existing in the snoop filter 304. In some embodiments, the snoop filter 304 may also store portions of the virtual address tags and/or way information received from the SMMU 306 to entries for corresponding lines in the snoop filter 304. In some embodiments, the snoop filter 304 may update aliasing counters in the snoop filter 304 depending on information in and/or associated with the physical addresses, such as index and/or way information and the validity indicators. For example, the snoop filter 304 may initialize and/or increase aliasing counters corresponding to set indices and/or ways based on the set indices being part of the physical addresses, the ways of the virtual cache 308 associated in the snoop filter 304 with the physical addresses, and/or the validity indicators associated in the snoop filter 304 with the physical addresses and indicating to the snoop filter 304 that the lines are valid. The snoop filter 304 may decrease aliasing counters corresponding to set indices and/or ways based on the set indices being part of the physical addresses and/or the ways associated with the physical addresses, and based on the validity indicators indicating to the snoop filter 304 that the lines are invalid.

In some embodiments, such as the example illustrated in FIG. 4, the snoop filter 304 may be integrated into a physical cache 402, such as an L2 cache for the processor core 310. The snoop filter 304 and the physical cache 402 may share entries of the physical address tags for the lines in the virtual cache 308. Further, the snoop filter 304 and the physical cache 402 may share coherency mechanisms for implementing cache coherency in the virtual cache 308. Integrating the snoop filter 304 with the physical cache 402 may reduce the area used on a chip (e.g., SoC 102) used to implement the snoop filter 304. Integrating the snoop filter 304 with the physical cache 402 may also enable the snoop filter 304 to respond with data to read snoops from the processing devices for clean lines, and to quickly reload invalidated date from closer upper level caches (e.g., shared processor core cache 220, 222, processor shared cache 220, shared system cache 240 in FIG. 2).

Figure 5:
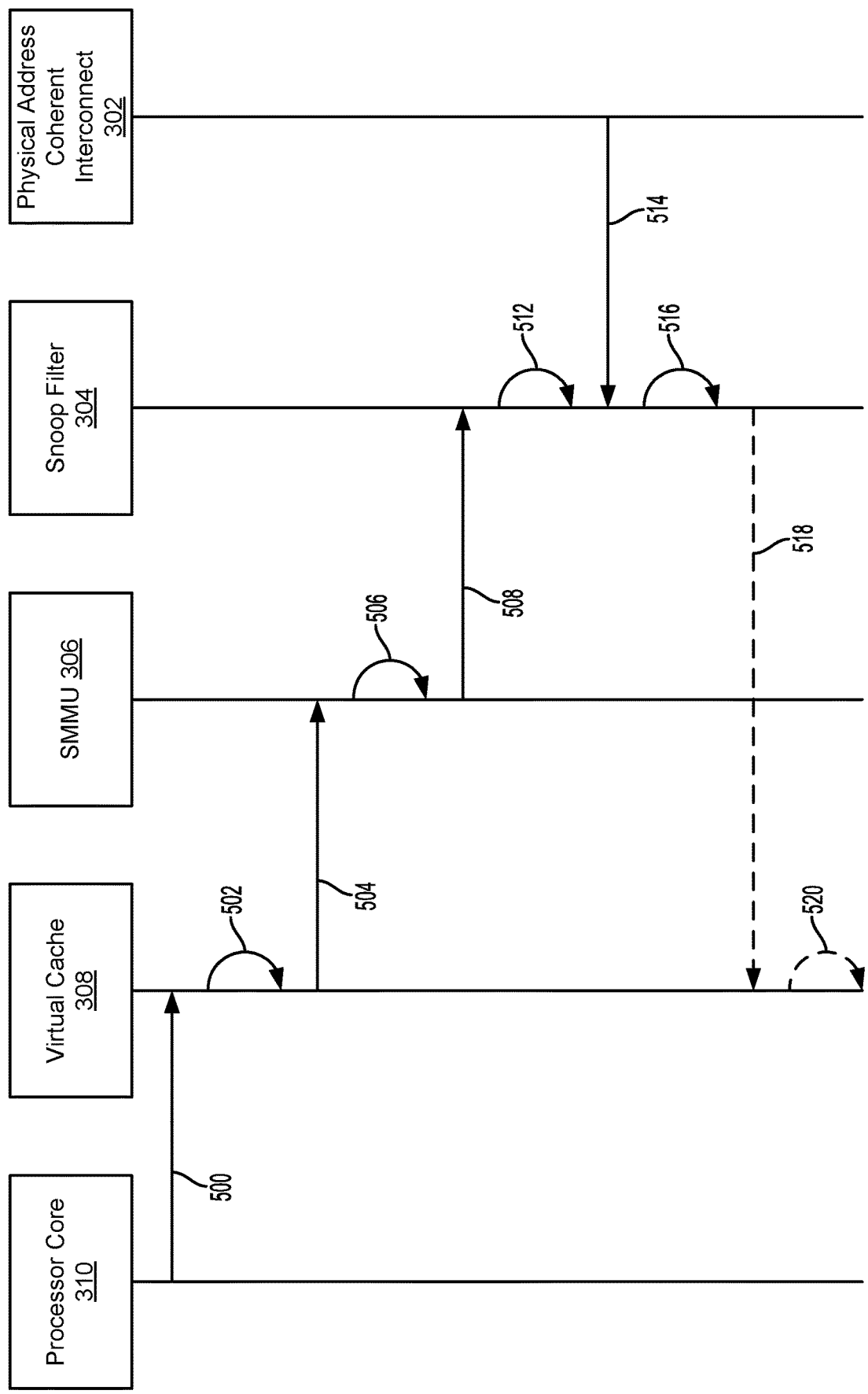
FIG. 5 is a component block and signaling diagram illustrating an example virtual cache coherency system suitable for implementing various embodiments.

FIG. 5 illustrates an example of signaling within a virtual cache coherency system suitable for implementing various embodiments. With reference to FIGS. 1-4, a virtual cache coherency system (e.g., virtual cache coherency system 300, 400), may include a physical address coherent interconnect 302, a snoop filter 304, an SMMU 306, a virtual cache 308, and a processor core 310. In the various embodiments and examples described herein, for the sake of clarity and ease of explanation, the term "physical address" refers to some and/or all of a physical address, including any combination of physical address tag, index, an/or line information, unless otherwise specified.

The processor core 310 may send a read and/or write request 500 to the virtual cache 308. The virtual address of the read and/or write request 500 may include the virtual address tag and the index for accessing a location in the virtual cache 308. The processor core 310 may execute a read of data from and/or a write of data to the virtual cache 308.

The virtual cache 308 may receive the read and/or write request 500 from the processor core 310. In response to receiving the read and/or write request 500, the virtual cache 308 may allocate a line and/or update a virtual address tag 502 in the virtual cache 308. The virtual cache 308 may allocate a line in the virtual cache 308 in response to a write request 500 from the processor core 310 for a virtual address at which no valid line is stored. As part of allocating the line, the virtual cache 308 may also set a validity indicator for the line to indicate to the snoop filter 304 that the line is valid. The virtual cache 308 may update a virtual address tag in the virtual cache 308 in response to a write request 500 from the processor core 310 for a virtual address at which a valid line is stored. Updating the virtual address tag may include setting the validity indicator stored in association with the virtual address tag for the line in the virtual cache 308 to indicate to the snoop filter that the line is invalid.

The virtual cache 308 may send the virtual address 504 to the SMMU 306. The virtual address may include a virtual address tag. In some embodiments, the virtual address may further include index and line information. In some embodiments, the virtual cache 308 may send way information for the line in the virtual cache 308.

The SMMU 306 may receive the virtual address 504 from the virtual cache 308. The SMMU 306 may translate the virtual address to a physical address 506. Translation of the virtual address to the physical address may be accomplished via an algorithm configured to translate the virtual address tag of the virtual address to a physical address tag of the physical address. At least part of the index and/or line information of the virtual address may be the same as part of the index and/or line information of the physical address. The virtual address of the line in the virtual cache may be translated to the physical address of the same line in a physical cache (e.g., private processor core cache 210, 212, 214, 216, shared processor core cache 220, 222, processor shared cache 220, shared system cache 240 in FIG. 2).

The SMMU 306 may send the physical address 508 to the snoop filter 304. Depending on the configuration of the snoop filter 304, the SMMU 306 may send some or all of the physical address 508 to the SMMU 306. For example, the snoop filter 304 may be configured to store physical address tags in an entry for a line in the snoop filter 304, and the SMMU 306 may be configured to send the physical address tag for the line to the snoop filter 304. In some embodiments, the snoop filter 304 may be further configured to store index and line information of the physical address, and the SMMU 306 may be further configured to send the index and/or line information for the line to the snoop filter 304. In some embodiments, the snoop filter 304 may be further configured to store way information, and the SMMU 306 may be further configured to send the way information for the line in the virtual cache 308 to the snoop filter 304. In some embodiments, the snoop filter 304 may be further configured to store portions of virtual address tags, and the SMMU 306 may be further configured to send a portion of the virtual address tag for the line to the snoop filter 304.

The snoop filter 304 may receive the physical address 508 from the SMMU 306. In some embodiments, depending on the configuration of the snoop filter 304, the snoop filter may receive some or all of the physical address 508 from the SMMU 306. For example, the snoop filter 304 may be configured to store physical address tags in an entry for a line in the snoop filter 304 and to receive the physical address tag for the line from the SMMU 306. In some embodiments, the snoop filter 304 may be further configured to store index and/or line information of the physical address and to receive the index and/or line information for the line from the SMMU 306. In some embodiments, the snoop filter 304 may be further configured to store way information and to receive the way information for the line in the virtual cache 308 from the SMMU 306. In some embodiments, the snoop filter 304 may be further configured to store portions of virtual address tags and to receive a portion of the virtual address tag for the line from the SMMU 306.

The snoop filter 304 may create and/or update entries 512 in the snoop filter 304. In response to receiving a physical address from the SMMU 306 that is not part of an entry in the snoop filter 304, the snoop filter 304 may create an entry for the physical address in the snoop filter 304. The entry may include the physical address tag of the physical address for the line. In some embodiments, the entry may further include any combination of index and/or line information of the physical address. In some embodiments, the entry may further include way information for the line in the virtual cache 308. In some embodiments, the entry may further include a portion of the virtual address tag of the virtual address for the line. In response to receiving a physical address from the SMMU 306 that is part of an entry in the snoop filter 304, the snoop filter 304 may update the entry.

The physical address coherent interconnect 302 may send a snoop of the virtual cache 514, and the snoop filter 304 may receive the snoop of the virtual cache 514. The snoop of the virtual cache may include a physical address of a line to be snooped and whether the snoop is a read snoop or write snoop.

The snoop filter 304 may determine whether an entry for the physical address for the line of the snoop exists in the snoop filter 516. The snoop filter 304 may compare the physical address of the snoop to physical addresses of the entries in the snoop filter 304. For example, the snoop filter 304 may compare the physical address tag of the snoop to physical address tags of the entries in the snoop filter 304. In some embodiments, the snoop filter 304 may further compare index and/or line information of the physical address of the snoop to index and/or line information of physical addresses of the entries in the snoop filter 304. Matching physical addresses from the snoop and from an entry in the snoop filter 304 may indicate to the snoop filter 304 that the line of the snoop exists in the virtual cache 308. Mismatched physical addresses from the snoop and from all entries in the snoop filter 304 may indicate to the snoop filter 304 that the line of the snoop does not exist in the virtual cache 308.

In response to determining that the line of the snoop does not exist in the virtual cache 308, the snoop filter 304 may prevent cache coherency operations from being sent to the virtual cache 308. In some embodiments, the snoop filter 304 may prevent cache coherency operations from being sent to the virtual cache 308 through inaction.

In response to determining that the line of the snoop does exist in the virtual cache, the snoop filter 304 may send a cache coherency operation 518 to the virtual cache 308. The cache coherency operation may specify the type of cache coherency operation. For example, in response to determining that the line of the snoop does exist in the virtual cache and the snoop is a write snoop for the line in the physical cache, the snoop filter 304 may send an invalidate cache coherency operation to the virtual cache 308. For further example, in response to determining that the line of the snoop does exist in the virtual cache and the snoop is a read snoop for the line in the physical cache, the snoop filter 304 may send a flush cache coherency operation to the virtual cache 308.

The virtual cache 308 may receive the cache coherency operation 518 from the snoop filter 304. In response to receiving the cache coherency operation 518, the virtual cache 308 may implement the cache coherency operation 520 in the virtual cache 308. For example, in response to receiving an invalidate cache coherency operation, the virtual cache 308 may invalidate all of the lines in the virtual cache 308 by setting the validity indicator of each line as invalid. For further example, in response to response to receiving a flush cache coherency operation, the virtual cache 308 may write out all of the lines of the virtual cache to a higher level memory, such as a main memory and/or disk storage memory (e.g., memory 106, 114 in FIG. 1).

Figure 6:
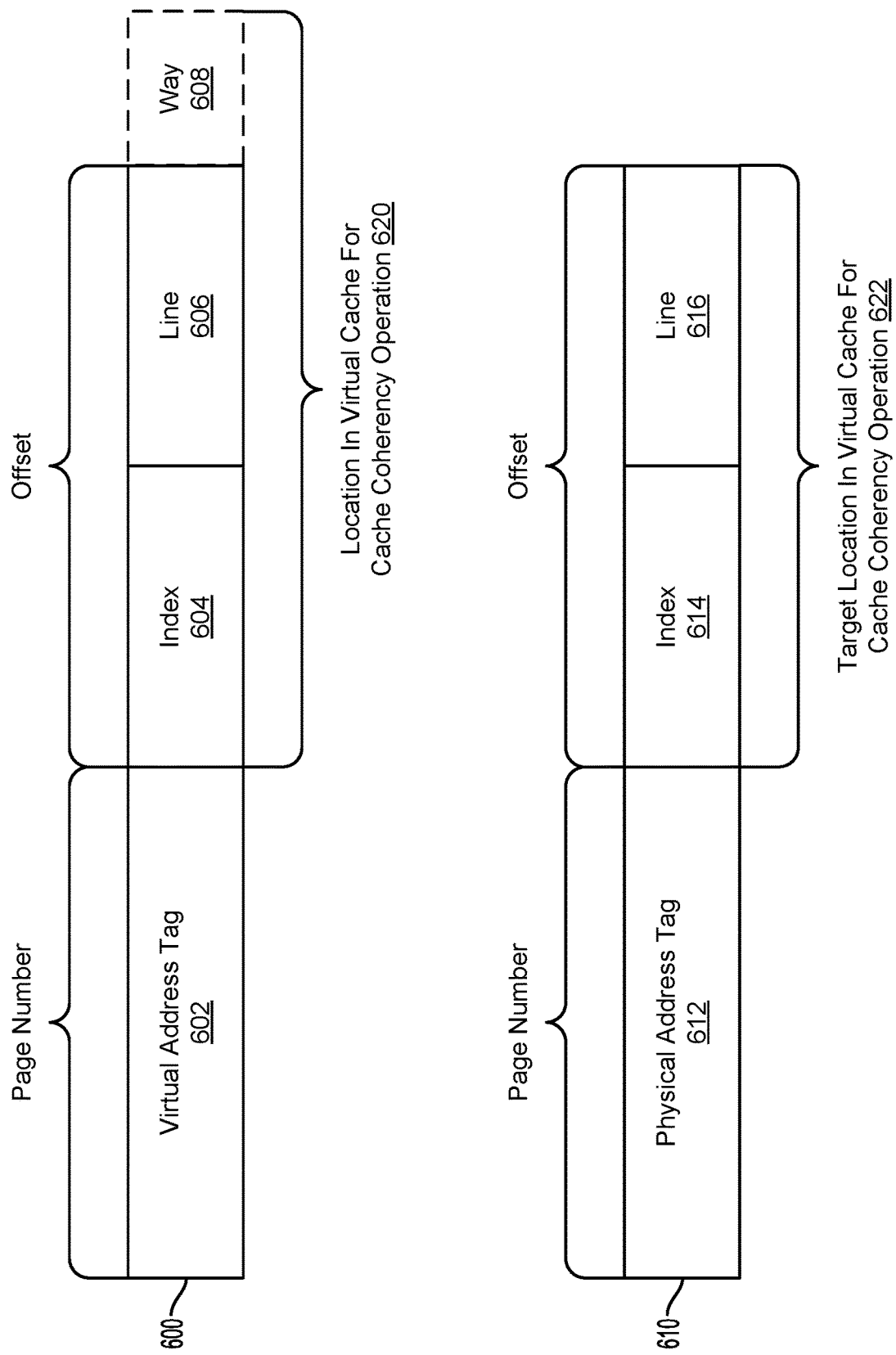
FIG. 6 is a block diagram illustrating examples of a virtual cache address and a physical cache address for use in a virtual cache coherency system with correspondence between lines in a virtual cache and entries for lines in a snoop filter suitable for implementing various embodiments.

FIGS. 6 and 7 illustrate examples of a virtual cache address and a physical cache address for use in a virtual cache coherency system with correspondence between lines in a virtual cache and entries for lines in a snoop filter suitable for implementing various embodiments. With reference to FIGS. 1-5, in some embodiments, the snoop filter (e.g., snoop filter 304 in FIGS. 3-5) may implement correspondence between lines in the virtual cache (e.g., virtual cache 308 in FIGS. 3-5) and entries for lines in the snoop filter. The virtual cache may store lines located according to a virtual address 600. The virtual address 600 for each line may include virtual address tag 602, index 604, and/or line 608 information. In some embodiments, the virtual cache may store lines located according to way 608 information.

The SMMU (e.g., SMMU 306 in FIGS. 3-5) may be configured to convert a virtual address 600 of the virtual cache to a physical address 610. The snoop filter may be configured to receive physical addresses 610 from the SMMU and store the physical addresses 610 in entries in the snoop filter. The snoop filter may also be configured to receive physical addresses 610 as part of a snoop from a processing device (e.g., CPU 104, processor 124 in FIG. 1, processor 200, processor core 202, 204, 206, 208 in FIG. 2) via a physical address coherency interface (e.g., physical address coherency interface 302 in FIGS. 3-5). The physical address 610 may include physical address tag 612, index 614, and/or line 616 information. In some embodiments, the SMMU may be further configured to send portions of virtual address tag 702 of the virtual address 600 and/or way 608 information for a line at the virtual address 600. The snoop filter may be further configured to receive portions of virtual address tag 702 of virtual addresses 600 and/or way 608 information from the SMMU and store the portions of virtual address tag 702 and/or way 608 information in entries in the snoop filter in association with the physical addresses 610 that correspond to the virtual addresses 600.

Correspondence may map any number of lines in the virtual cache to entries in the snoop filter, such as 1:N mappings in which one snoop filter entry is mapped to "N" lines in the virtual cache, where N may be any integer greater than or equal to one. In some embodiments, the snoop filter may implement correspondence by storing index 614, line 616, way 608, and/or portions of virtual address tag 702 information for the lines in the virtual cache and received from the SMMU in association with the physical address tag 612 information of the physical addresses 610 received from the SMMU. In some embodiments, the snoop filter may implement correspondence by storing the physical address tag 612 information of the physical addresses 610 received from the SMMU and using index 614 and/or line 616 information of the snoops of the virtual cache received from the processing device that are part of a physical address 610 having a physical address tag 612 matching a stored physical address tag 612. The index 614 and line 616 information of a physical address 610 of a snoop may be the same as the index 604 and line 606 information of a virtual address 600 in the virtual cache that translates to the physical address 610. Therefore, the index 614 and line 616 information of a physical address 610 of the snoop may be used to indicate to the virtual cache the same index 604 and line 606 information of a virtual address 600 in the virtual cache. Further, the way 608 and/or portions of virtual address tag 702 information for the lines in the virtual cache may be used to indicate to the virtual cache the same way 608 and/or portions of virtual address tag 702 of a virtual address 600 for a line in the virtual cache. The physical address tag 612, including portions of the physical address tag 712, may not be translatable to the virtual address tag 602, including portions of the virtual address tag 702. As such, the virtual cache may not be able to identify locations of lines in the virtual cache using portions of the physical address tag 712, and portions of the virtual address tag 702 may be sent to the virtual cache to identify locations of lines in the virtual cache.

The virtual cache may be configured to use any combination of the index 614, line 616, way 608, and/or portions of virtual address tag 702 information received from the snoop filter to determine for which lines in the virtual cache to implement cache coherency operations. As such, implementing coherency may decrease the overfitting of cache coherency operations to lines in the virtual cache for which the cache coherency operation may not need to be implemented. For example, cache coherency operations may be implemented for a number of lines in the virtual cache that is less than all of the lines in the virtual cache.

The snoop filter may determine whether a physical address 610 of a snoop matches an entry in the snoop filter by comparing the physical address tags 612 of each. In response to determining that the physical address 610 of a snoop matches an entry in the snoop filter, the snoop filter may send a cache coherency operation to the virtual cache. The snoop filter may specify a physical address 610 for the cache coherency operation. The physical address 610 for the cache coherency operation may include the index 614 and/or line 616 information of the entry in the snoop filter that matches the physical address 610. The index 614 and/or line 616 information sent by the snoop filter may represent a target location in the virtual cache for a cache coherency operation 622. In some embodiments, the snoop filter may be further configured to send the way 608 information and/or portions of virtual address tag 702 of the virtual address 600 corresponding to the physical address 610. The portions of virtual address tag 702, index 614, line 616, and/or way 608 information sent by the snoop filter may represent a target location in the virtual cache for a cache coherency operation 722.

As the virtual cache is configured to store lines according to virtual addresses 600, the physical address tags 612 may not be able to indicate to the virtual cache for which lines to implement the cache coherency operations. However, as discussed herein, the index 614 and/or line 616 information of the physical address 610 may be the same as the index 604 and/or line 606 information of the corresponding virtual address 600. Further, the portions of virtual address tag 702 may be of the corresponding virtual address 600 and/or the way 608 information may be of a line in the virtual cache corresponding to the virtual address 600. Therefore, any combination of the index 614, line 616, virtual address tag 702, and/or way 608 information may be sent to the virtual cache with the cache coherency operations by the snoop filter and used by the virtual cache to identify for which lines in the virtual cache to implement the cache coherency operations. In other words, the target locations in the virtual cache for a cache coherency operation 622, 722 may correspond with locations in the virtual cache for cache coherency operations 620, 720. The more of the index 614, line 616, virtual address tag 702, and/or way 608 information sent with the cache coherency operations, the higher the ration of correspondence may be. For example, sending all of the index 614, line 616, virtual address tag 702, and/or way 608 information with the cache coherency operations may result in a 1:1 correspondence between entries in the snoop filter and lines in the virtual cache. Omitting any of the index 614, line 616, virtual address tag 702, and/or way 608 information from the cache coherency operation may reduce the correspondence between the entries in the snoop filter and lines in the virtual cache. For example, sending only index 614 information with the cache coherency operations may result in a 1:N correspondence between entries in the snoop filter and lines in the virtual cache in which N is a number of lines in a set of the virtual cache.

Figure 8A:
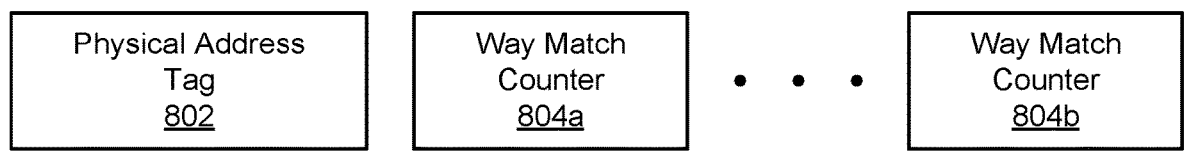
FIGS. 8A and 8B are block diagrams illustrating examples of snoop filter data for use in a virtual cache coherency system with aliasing of virtual cache addresses suitable for implementing various embodiments.
Figure 8B:
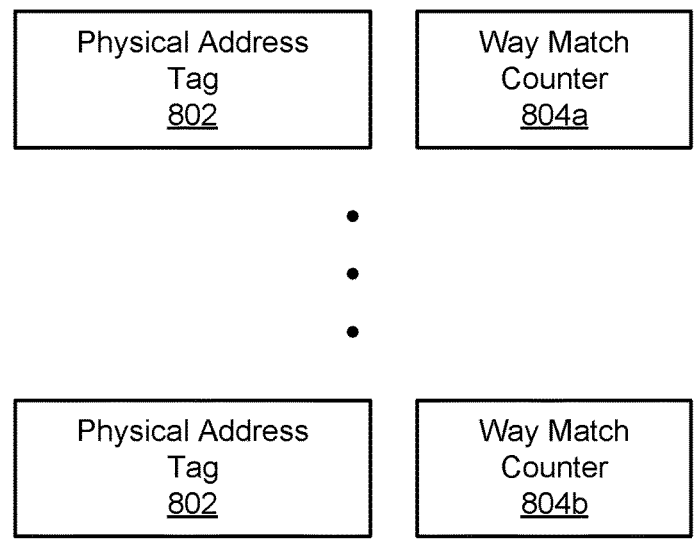

FIGS. 8A and 8B illustrate examples of snoop filter data for use in a virtual cache coherency system with aliasing of virtual cache addresses suitable for implementing various embodiments. With reference to FIGS. 1-7, in some embodiments, the snoop filter (e.g., snoop filter 304 in FIGS. 3-5) may implement aliasing of lines of the virtual cache (e.g., virtual cache 308 in FIGS. 3-5) in the snoop filter (e.g., snoop filter 304 in FIGS. 3-5). Aliasing may be implemented via known means, such as page table aliasing, and/or correspondence. Counters 804a, 804b may be added to the snoop filter entries to track the number of aliased lines in the virtual cache for the snoop filter entries.

The virtual cache may store lines located according to a virtual address (e.g., virtual address 600 in FIGS. 6 and 7). The virtual address for each line may include index (e.g., index 604 in FIGS. 6 and 7) and line (e.g., line 608 in FIGS. 6 and 7) information. The SMMU (e.g., SMMU 306 in FIGS. 3-5) may be configured to convert a virtual address (e.g., virtual address 600 in FIGS. 6 and 7) of the virtual cache to a physical address (e.g., physical address 610 in FIGS. 6 and 7) and send the physical address to the snoop filter. In some embodiments, the location of the line stored in the virtual cache may also include way (e.g., way 608 in FIGS. 6 and 7) information. In some embodiments, the SMMU may be further configured to send portions of virtual address tag (e.g., virtual address tag 702 in FIG. 7) and/or way (e.g., way 608 in FIGS. 6 and 7) information of the virtual address.

The snoop filter may be configured to receive physical addresses from the SMMU. The physical address may include physical address tag (e.g., physical address tag 612 in FIGS. 6 and 7), index (e.g., index 614 in FIGS. 6 and 7), and/or line (e.g., line 616 in FIGS. 6 and 7) information. The snoop filter may be further configured to receive portions of the virtual address tag and/or way information of virtual addresses from the SMMU. The snoop filter may be configured to store entries in the snoop filter having a physical address tag 802 and any number of counters 804a, 804b. The counters 804a, 804b may be configured to track the number of aliased lines in the virtual cache for the snoop filter entries. The counters 804a, 804b may track the number of aliased lines by tracking the number of lines that meet certain conditions, such as lines having the same index information and/or lines having the same portions of the virtual address tag and/or in the same way. Initialization of the counters 804a, 804b and/or increase the number of aliased lines in the virtual cache for the snoop filter entries may result from allocation of lines in the virtual cache. Snoop filter entries may be removed in response to associated counters 804a, 804b indicating that there are no aliased lines in the virtual cache for the snoop filter entries. Reduction in the number of aliased lines in the virtual cache for the snoop filter entries may result from policy based eviction of the lines in the virtual cache. Overflow of the counters 804a, 804b may cause the snoop filter to transition to removing snoop filter entries in response to implementation of cache coherence operations in the virtual cache. Removal of a snoop filter entry with a counter 804a, 804b may cause a cache coherency operation to evict aliased lines in the virtual cache for the snoop filter entry based on matching counter 804a, 804b information and/or index information from a snoop. Removal of a snoop filter entry with an overflow counter 804a, 804b may cause a cache coherency operation to evict all aliased lines in the virtual cache for the snoop filter entry. Implementing aliasing may avoid implementing cache coherency operations for lines not in the virtual cache as snoop filter entries may be removed in response to the associated counters 804a, 804b indicating to the snoop filter that no aliased lines exist in the virtual cache for the snoop filter entries.

In some embodiments, an entry 800 in the snoop filter may include the physical address tag 802 and multiple counters 804a, 804b, each counter 804a, 804b configured to represent a different condition for aliasing a line in the virtual cache. In some embodiments, multiple entries 806 in the snoop filter may include the same physical address tag 802 and each of the multiple entries 806 may include any number of counters 804a, 804b, such as few as a single counter 804a, 804b, configured to represent a different condition for aliasing a line in the virtual cache. For example, a first counter 804a may be configured to represent a condition of a line in the virtual cache being in a first way and a second counter 804b may be configured to represent a condition of a line in the virtual cache being in a second way. Each counter 804a, 804b may track a number of lines in the virtual cache that meet the condition for the counter 804a, 804b.

Figure 9:
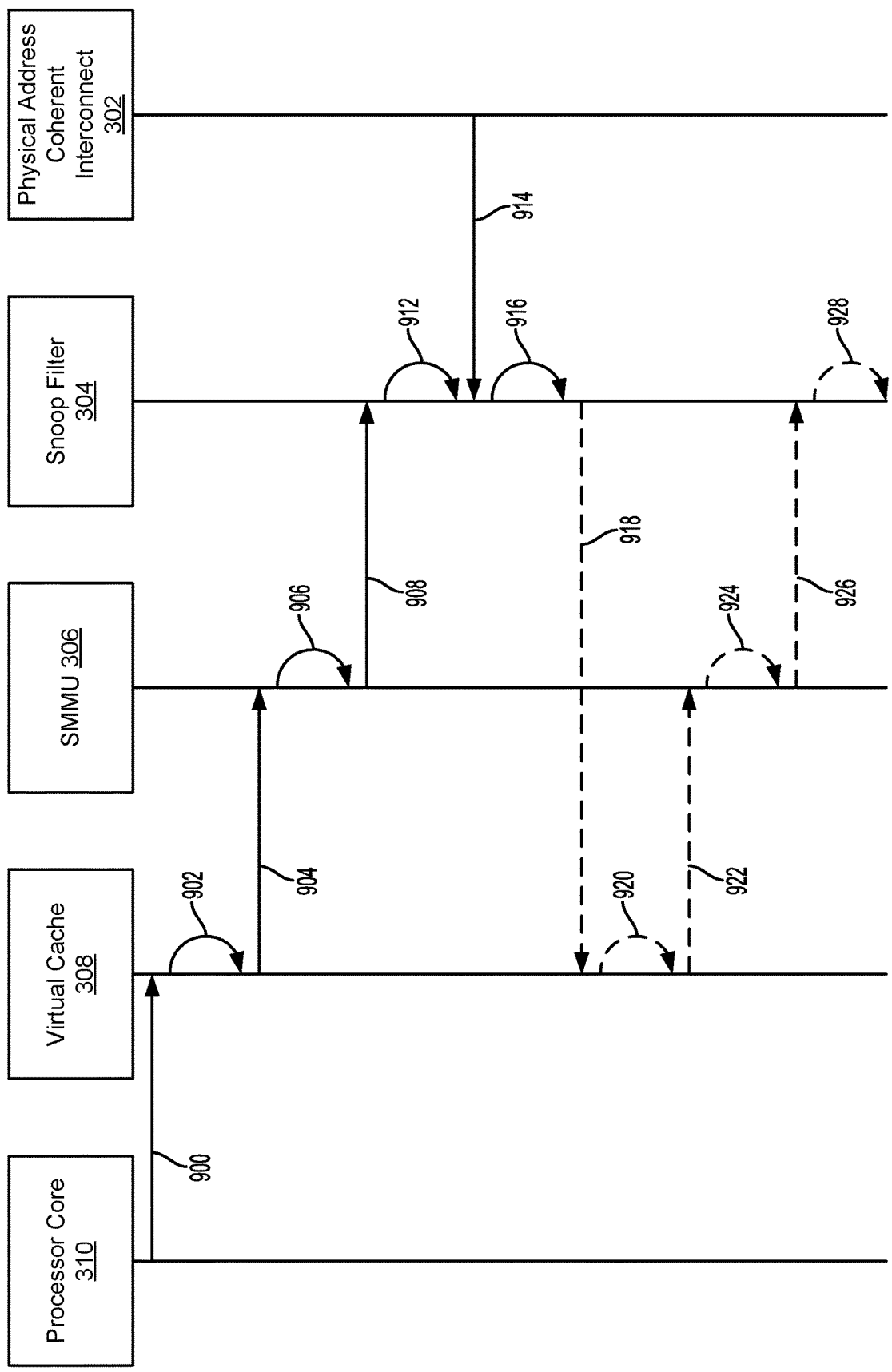
FIG. 9 is a component block and signaling diagram illustrating an example virtual cache coherency system with correspondence between lines in a virtual cache and entries for lines in a snoop filter and/or with aliasing of virtual cache addresses suitable for implementing various embodiments.

FIG. 9 illustrates an example virtual cache coherency system with correspondence between lines in a virtual cache and entries for lines in a snoop filter and/or with aliasing of virtual cache addresses suitable for implementing various embodiments. With reference to FIGS. 1-8, a virtual cache coherency system (e.g., virtual cache coherency system 300, 400), may include a physical address coherent interconnect 302, a snoop filter 304, an SMMU 306, a virtual cache 308, and a processor core 310. In the various embodiments and examples described herein, for the sake of clarity and ease of explanation, the term "physical address" refers to some and/or all of a physical address (e.g., physical address 610 in FIGS. 6 and 7), including any combination of physical address tag (e.g., physical address tag 612 in FIGS. 6 and 7), index (e.g., index 614 in FIGS. 6 and 7), an/or line (e.g., line 616 in FIGS. 6 and 7) information, unless otherwise specified.

The processor core 310 may send a read and/or write request 900 to the virtual cache 308. The virtual address (e.g., virtual address 600 in FIGS. 6 and 7) of the read and/or write request 900 may include the virtual address tag (e.g., virtual address tag 602 in FIGS. 6 and 7) and the index (e.g., index 604 in FIGS. 6 and 7) for accessing a location in the virtual cache 308. The processor core 310 may execute a read of data from and/or a write of data to the virtual cache 308.

The virtual cache 308 may receive the read and/or write request 900 from the processor core 310. In response to receiving the read and/or write request 900, the virtual cache 308 may allocate a line and/or update a virtual address tag 902 in the virtual cache 308. The virtual cache 308 may allocate a line in the virtual cache 308 in response to a write request 900 from the processor core 310 for a virtual address at which no valid line is stored. As part of allocating the line, the virtual cache 308 may also set a validity indicator for the line to indicate to the snoop filter 304 that the line is valid. The virtual cache 308 may update a virtual address tag in the virtual cache 308 in response to a write request 900 from the processor core 310 for a virtual address at which a valid line is stored. Updating the virtual address tag may include setting the validity indicator stored in association with the virtual address tag for the line in the virtual cache 308 to indicate to the snoop filter 304 that the line is invalid.

The virtual cache 308 may send the virtual address 904 to the SMMU 306. The virtual address may include a virtual address tag. In some embodiments, the virtual address may further include index and line (e.g., line 606 in FIGS. 6 and 7) information. In some embodiments, a location of the allocated line in the virtual cache may further include way (e.g., way 608 in FIGS. 6 and 7) information and the virtual cache 308 may send the way information to the SMMU 306. In some embodiments, the virtual cache may further send a validity indicator of the line corresponding to the virtual address 904, such as whether the line has been invalidated as a result of a virtual cache eviction policy and/or operation by the processor core 310.

The SMMU 306 may receive the virtual address, way information, and/or the validity indicator 904 from the virtual cache 308. The SMMU 306 may translate the virtual address to a physical address 906. Translation of the virtual address to the physical address may be accomplished via an algorithm configured to translate the virtual address tag of the virtual address to a physical address tag of the physical address. The index and line information of the virtual address may be the same as the index and line information of the physical address. The virtual address of the line in the virtual cache 308 may be translated to the physical address of the same line in a physical cache (e.g., private processor core cache 210, 212, 214, 216, shared processor core cache 220, 222, processor shared cache 220, shared system cache 240 in FIG. 2).

The SMMU 306 may send the physical address and/or validity indicator 908 to the snoop filter 304. Depending on the configuration of the snoop filter 304, the SMMU 306 may send some or all of the physical address 908 to the snoop filter 304. For example, the snoop filter 304 may be configured to store physical address tags in an entry for a line in the snoop filter 304, and the SMMU 306 may be configured to send the physical address tag for the line to the snoop filter 304. In some embodiments, the snoop filter 304 may be further configured to store index and line information of the physical address, and the SMMU 306 may be further configured to send the index and line information for the line to the snoop filter 304. In some embodiments, the snoop filter 304 may be further configured to store way information, and the SMMU 306 may be further configured to send the way information for the line in the virtual cache 308 to the snoop filter 304. In some embodiments, the snoop filter 304 may be further configured to store portions of virtual address tags (e.g., portions of virtual address tags 702 in FIGS. 6 and 7), and the SMMU 306 may be further configured to send a portion of the virtual address tag for the line to the snoop filter 304.

The snoop filter 304 may receive the physical address and/or the validity indicator 908 from the SMMU 306. In some embodiments, depending on the configuration of the snoop filter 304, the snoop filter 304 may receive some or all of the physical address 908 from the SMMU 306. For example, the snoop filter 304 may be configured to store physical address tags in an entry for a line in the snoop filter 304 and to receive the physical address tag for the line from the SMMU 306. In some embodiments, the snoop filter 304 may be further configured to store index and line information of the physical address and to receive the index and line information for the line from the SMMU 306. In some embodiments, the snoop filter 304 may be further configured to store way information and to receive the way information for the line in the virtual cache 308 from the SMMU 306. In some embodiments, the snoop filter 304 may be further configured to store portions of virtual address tags and to receive a portion of the virtual address tag for the line from the SMMU 306.

The snoop filter 304 may create and/or update entries 912 in the snoop filter 304. In response to receiving a physical address from the SMMU 306 that is not part of an entry in the snoop filter 304, the snoop filter 304 may create an entry for the physical address in the snoop filter 304. The entry may include the physical address tag of the physical address for the line. In some embodiments, the entry may further include any combination of index and/or line information of the physical address. In some embodiments, the entry may further include way information for the line in the virtual cache 308. In some embodiments, the entry may further include a portion of the virtual address tag of the virtual address for the line. In response to receiving a physical address from the SMMU 306 that is part of an entry in the snoop filter 304, the snoop filter 304 may update the entry.

For example, the snoop filter 304 may be configured to implement correspondence between lines in the virtual cache 308 and entries for lines in the snoop filter 304. The snoop filter 304 may store any combination of index, line, way, and/or portions of virtual address tag information for the lines in the virtual cache 308 in association with the physical address tag information for the lines to achieve a 1:N mapping of one snoop filter entry to N lines in the virtual cache 308. In response to receiving a physical address from the SMMU 306 that is part of an entry in the snoop filter 304, the snoop filter 304 may update the entry by mapping an additional line to the snoop filter entry. For example, the snoop filter may add index, line, way, and/or portions of virtual address tag information for the line to the snoop filter entry so that the line is associated with the physical address tag of the snoop filter entry.

For another example, the snoop filter 304 may be configured to implement aliasing of virtual cache addresses. The snoop filter 304 may include counters (e.g., counters 804a, 804b in FIGS. 8A-8B) configured to track the number of aliased lines in the virtual cache 308 for the snoop filter entries. The counters may further be configured to track the number of lines that meet certain conditions, such as lines having the same index information and/or lines in the same way. Updating the snoop filter entries may include increasing the representation in a counter of the number of aliased lines in the virtual cache 308 as a result of allocation of lines in the virtual cache 308. Updating the snoop filter entries may include decreasing the representation in a counter of the number of aliased lines in the virtual cache 308 as a result of deallocation of lines in the virtual cache 308. In some embodiments, deallocation may be indicated to the snoop filter 304 via the validity indicator for the line indicating to the snoop filter 304 that the line is invalidated. Reduction in the number of aliased lines in the virtual cache 308 for the snoop filter entries may result from policy based eviction of the lines in the virtual cache 308. Updating the snoop filter entries may include removing the snoop filter entries in response to the associated counters indicating that there are no aliased lines in the virtual cache 308 for the snoop filter entries. Overflow of the counters may cause the snoop filter 304 to transition to removing snoop filter entries in response to implementation of cache coherence operations in the virtual cache 308. Conflict evictions in response to failed addition and/or modification of an entry at a location in the snoop filter 304 may cause the snoop filter 304 to remove entries at the location. In some embodiments, the removal of the entry may cause the snoop filter 304 to issue a cache coherency operation to flush all of the aliased lines in the virtual cache 308 for the removed snoop filter entry. In some embodiments, the removal of the entry may cause the snoop filter 304 to issue a cache coherency operation to flush the entire virtual cache 308.

The physical address coherent interconnect 302 may send a snoop of the virtual cache 914, and the snoop filter 304 may receive the snoop of the virtual cache 914. The snoop of the virtual cache may include a physical address of a line to be snooped and whether the snoop is a read snoop or write snoop.

The snoop filter 304 may determine whether an entry for the physical address for the line of the snoop exists in the snoop filter 916. The snoop filter 304 may compare the physical address of the snoop to physical addresses of the entries in the snoop filter 304. For example, the snoop filter 304 may compare the physical address tag of the snoop to physical address tags of the entries in the snoop filter 304. In some embodiments, the snoop filter 304 may further compare index and/or line information of the physical address of the snoop to index and/or line information of physical addresses of the entries in the snoop filter 304. Matching physical addresses from the snoop and from an entry in the snoop filter 304 may indicate to the snoop filter 304 that the line of the snoop exists in the virtual cache 308. Mismatched physical addresses from the snoop and from all entries in the snoop filter 304 may indicate to the snoop filter 304 that the line of the snoop does not exist in the virtual cache 308.

In response to determining that the line of the snoop does not exist in the virtual cache 308, the snoop filter 304 may prevent cache coherency operations from being sent to the virtual cache 308. In some embodiments, the snoop filter 304 may prevent cache coherency operations from being sent to the virtual cache 308 through inaction.

In response to determining that the line of the snoop does exist in the virtual cache 308, the snoop filter 304 may send a cache coherency operation 918 and virtual address information to the virtual cache 308. The snoop filter 304 may specify location in the virtual cache 308 at which to implement the cache coherency operation. For example, the snoop filter 304 may send index and/or line information. In some embodiments, the index and/or line information may be based on information from the physical address of the cache coherency operation for which the physical address was snooped. For further example, the snoop filter 304 may send way information. For further example, the snoop filter 304 may send portions of the virtual address tag. The cache coherency operation may specify the type of cache coherency operation. For example, in response to determining that the line of the snoop does exist in the virtual cache and the snoop is a write snoop for the line in the physical cache, the snoop filter 304 may send an invalidate cache coherency operation to the virtual cache 308. For further example, in response to determining that the line of the snoop does exist in the virtual cache and the snoop is a read snoop for the line in the physical cache, the snoop filter 304 may send a flush cache coherency operation to the virtual cache 308.

The virtual cache 308 may receive the cache coherency operation 918 and virtual address information from the snoop filter 304. In response to receiving the cache coherency operation and virtual address information 918, the virtual cache 308 may implement the cache coherency operation 920 in the virtual cache 308 for any number of locations corresponding to the virtual address information. For example, in response to receiving an invalidate cache coherency operation, the virtual cache 308 may invalidate all of the lines in the virtual cache 308 corresponding to the virtual address information by setting the validity indicator of each line as invalid. For further example, in response to receiving a flush cache coherency operation, the virtual cache 308 may write out all of the lines of the virtual cache that correspond to the virtual address information to a higher level memory, such as a main memory and/or disk storage memory (e.g., memory 106, 114 in FIG. 1).

For each line operated on by the cache coherency operation, the virtual cache 308 may send the virtual address and/or validity indicator 922 to the SMMU 306. The SMMU 306 may receive the virtual address and/or validity indicator 922 from the virtual cache 308. The SMMU 306 may translate the virtual address to a physical address 924. The SMMU 306 may send the physical address and/or the validity indicator 926 to the snoop filter 304. The snoop filter 304 may receive the physical address and/or the validity indicator 926 from the SMMU 306. Sending and receiving the virtual address and/or validity indicator 922, translating the virtual address to a physical address 924, and sending and receiving the physical address and/or the validity indicator 926 may be implemented in like manners to like operations 904, 906, 908 as described herein.

The snoop filter 304 may update entries 928 in the snoop filter 304. In response to receiving a physical address from the SMMU 306 that is part of an entry in the snoop filter 304, the snoop filter 304 may update the entry. For example, for the snoop filter 304 configured to implement correspondence between lines in the virtual cache 308 and entries for lines in the snoop filter 304, the snoop filter 304 may remove physical address tag, index, line, way, and/or portions of virtual address tag information for an invalidated line from the snoop filter entry. In some embodiments, removing the physical address tag may amount to removing the entry having the physical address tag from the snoop filter 304. As another example, for the snoop filter 304 implementing aliasing of virtual cache addresses, the snoop filter 304 may decrease the representation in a counter of the number of aliased lines in the virtual cache 308 as a result of deallocation of lines in the virtual cache 308. Reduction in the number of aliased lines in the virtual cache 308 for the snoop filter entries may result from an invalid validity indicator for a line. Updating the snoop filter entries may include removing the snoop filter entries in response to the associated counters indicating that there are no aliased lines in the virtual cache 308 for the snoop filter entries.

In some embodiments, the virtual cache 308 may send one or more memory commands to the snoop filter 304. The snoop filter 304 may receive the one or more memory commands and implement appropriate coherency sequences for issuing snoops for other memories. For example for a read operation, the snoop filter 304 may issue snoops to other masters before doing a memory request. Similarly, in some embodiments, when the virtual cache 308 processes a write operation, the virtual cache 308 may implement read-modify-write (RMW) operations, in which case the snoop filter 304 may acquire ownership of the virtual cache by issuing snoops. The ownership may be tracked in the snoop filter 304 or in the virtual cache 308. Alternately the virtual cache 308 may support partial dirty lines (e.g., using byte enables) or write buffering, in which case it may not do RMW operations. Instead, when dirty lines are evicted from the virtual cache 308, the snoop filer 304 may issue snoops for those cases (e.g., write without exclusive ownership).

Figure 10:
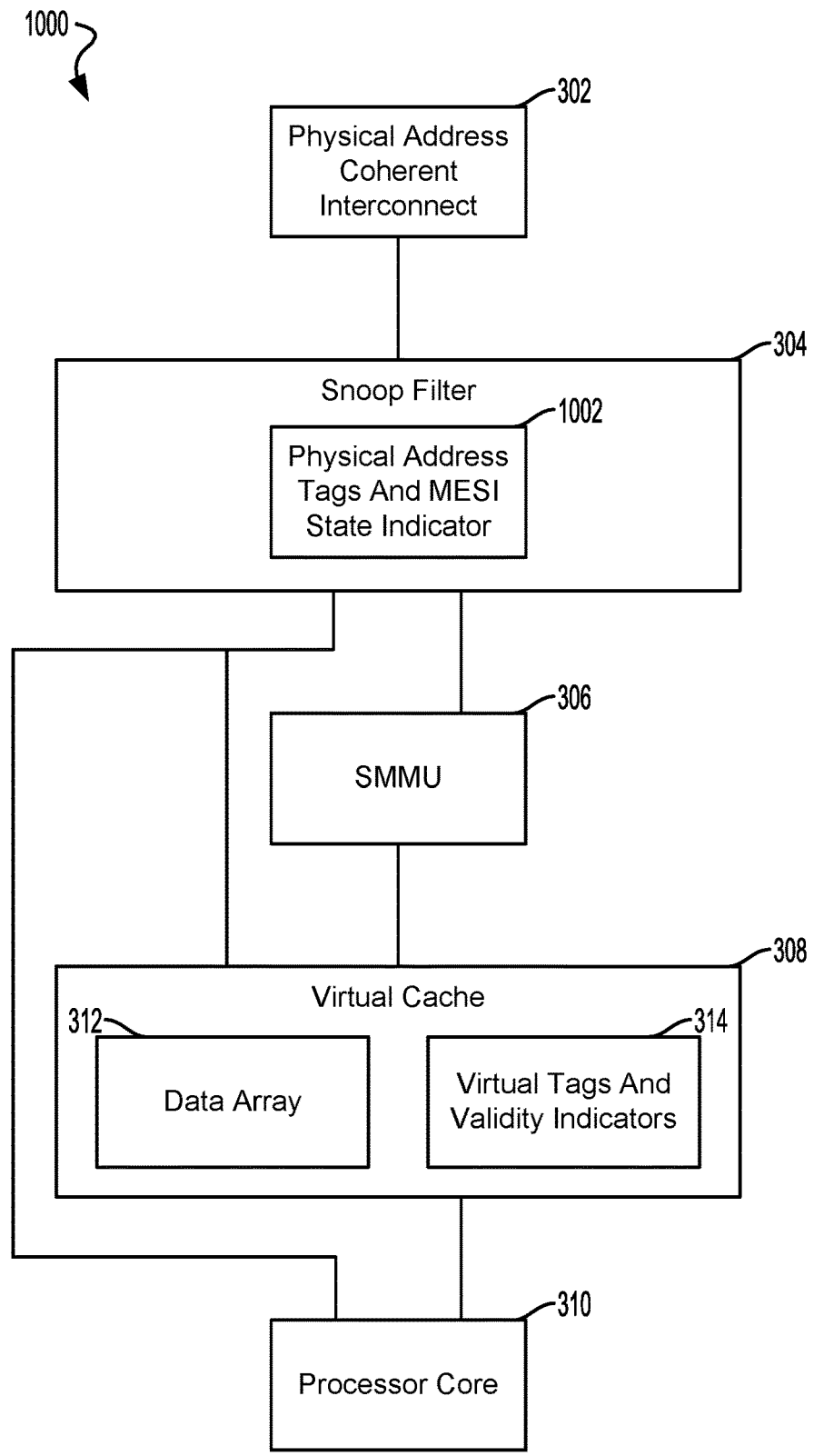
FIG. 10 is a component block diagram illustrating an example virtual cache coherency system suitable for implementing various embodiments.

FIG. 10 illustrates an example virtual cache coherency system suitable for implementing various embodiments. With reference to FIGS. 1-9, a virtual cache coherency system 1000 may be configured in a manner similar to the virtual cache coherency system 300 as described herein with reference to FIG. 3. In addition to the descriptions of virtual cache coherency system 300, the virtual cache coherency system 1000 may include the snoop filter 304 having entries 1002 including physical address tags and MESI state indicators.

Further, the virtual cache coherency system 1000 may implement the cache coherency operations in response to a snoop of a physical address having a corresponding entry in the snoop filter while there is a pending synchronization operation for the virtual cache 308 instituted by the processor core 310. As such, in addition to the descriptions of the virtual cache coherency system 300, the processor core 310 of the virtual cache coherency system 1000 may request synchronization operations for the virtual cache 304, such as acquiring and/or releasing at least portions of the virtual cache 304. The virtual cache 308 may include synchronization status bits for each line and/or groups of lines. In response to a release synchronization operation for a line, the virtual cache 308 may set the synchronization status bits to indicate to the virtual cache 308 a need to flush the line. In response to a flush event for a line, such as a read snoop, snoop shared, or external read, the virtual cache 308 may flush the line for which the synchronization status bits indicate to the virtual cache 308 the need to flush the line, and set the synchronization status bits to clear the indication of the need to flush the line. In response to an invalidate event for a line, such as a write snoop, snoop unique, or external read, the virtual cache 308 may set the synchronization status bits to indicate to the virtual cache 308 a need to invalidate the line, flush the line in response to the synchronization status bits indicating to the virtual cache 308 the need to flush the line, and set the synchronization status bits to clear the indication of the need to flush the line. In response to an acquire synchronization operation for a line, the virtual cache 308 may check the synchronization status bits to determine whether the synchronization status bits indicate to the virtual cache 308 a need to invalidate the line. In some embodiments, in response to the synchronization status bits indicating the need to invalidate the line, the virtual cache 308 may invalidate the line. In some embodiments in which the acquire synchronization operation may be attached to a data operation, such as a read or write, the virtual cache 308 may treat the data operation as a miss for that line in response to the synchronization status bits indicating the need to invalidate the line. Treating the data operation as a miss for the line may be performed instead of invalidating the line. As part of the response to the synchronization status bits indicating the need to invalidate the line, the virtual cache 308 may set the synchronization status bits to clear the indication of the need to invalidate the line. In response to both receiving a cache coherency operation and a synchronization status bit indicating to the virtual cache 308 a need to flush a line and/or groups of lines, the virtual cache 308 may implement the cache coherency operation. For example, in response to receiving a combination of a flush cache coherency operation and/or an invalidate cache coherency operation and a synchronization status bit set to indicate a need to flush, the virtual cache 308 may implement the flush cache coherency operation for a line and/or groups of lines. In response to receiving a combination of an acquire synchronization operation command and a synchronization status bit set to indicate a need to invalidate, the virtual cache 308 may implement the invalidate cache coherency operation for a line and/or groups of lines. For other combinations or when the synchronization status bits are not set, the virtual cache 308 may avoid implementing received cache coherency operations. When cache coherency operations are avoided, it may be acceptable for the processor core 310 and/or other coherent processing devices to use stale data from the virtual cache 308.

In some embodiments, the synchronization status bits may be used to implement versioning of the lines in the virtual cache 308. Versioning may be implemented to reduce full cache traversals for locating lines with synchronization status bits set for flushing or invalidating. The virtual cache 308 may be configured with any number of version identifiers. In some embodiments, a version identifier may be a global value for the virtual cache 308 for flushing, invalidating, and/or flushing and invalidating lines in the virtual cache 308. Each line in the virtual cache may be configured to store any number of version identifiers for flushing, invalidating, and/or flushing and invalidating a line and/or group of lines in the virtual cache 308.

In some embodiments, a version identifier for a line in the virtual cache 308 may be unset in response to the line being invalidated in the virtual cache 308. In some embodiments, the version identifier for the line in the virtual cache 308 may be unset in response to the line being replaced in the virtual cache 308.

In some embodiments, upon a release synchronization operation for lines in the virtual cache 308, the virtual cache 308 may advance a version identifier value for the virtual cache 308, which may be a value for invalidating, or flushing and invalidating lines in the virtual cache 308. A write operation for lines in the virtual cache 308 may cause the virtual cache 308 to set any unset version identifiers for the lines to the current version identifier value of the version identifier for the virtual cache 308 for invalidating, or flushing and invalidating lines in the virtual cache 308. A read snoop and/or a write snoop for lines in the virtual cache 308 may cause the snoop filter 304 to issue a flush cache coherency operation for the lines in the virtual cache 308 subject to the snoop that have version identifiers older than the version identifier of the virtual cache 308, and the virtual cache 308 may flush lines. As such, flushing of any lines with an unset version identifier, a new version identifier, or a version identifier equal to the version ID of the virtual cache may be avoided.

In some embodiments, upon an acquire synchronization operation for lines in the virtual cache 308, the virtual cache 308 may advance a version identifier value for the virtual cache 308, which may be a value for flushing, or flushing and invalidating lines in the virtual cache 308. A snoop for an invalidate cache coherency operation for lines in the virtual cache 308 may cause the virtual cache 308 to set any unset version identifiers for the lines to the current version identifier value of the version identifier for the virtual cache 308 for flushing, or flushing and invalidating lines in the virtual cache 308. A read operation for lines in the virtual cache 308 may cause the virtual cache 308 to invalidate and miss for lines that have version identifiers older than the acquired version identifier of the virtual cache 308. In some embodiments, the read operation may fetch the latest data from a higher level memory in response to execution of an acquire operation since a line has been modified in another memory (e.g., memory 106, 114 in FIG. 1), which may be indicated by a write snoop for the line to the snoop filter 304.

The version identifiers may overflow, such as when version numbers exceed the capacity of the version identifier bits. In some embodiments, overflow version identifiers may cause the virtual cache 308 to fully traverse the virtual cache 308 to implement cache coherency operations. In some embodiments, overflow version identifiers may cause the virtual cache 308 to fully traverse the virtual cache 308 to compact all existing versions of lines to a single old version of lines, and reset the version identifiers to an unused version identifier value.

In some embodiments, counters may be used to track a number of lines having a version identifier value. Previously used version identifier values that are no longer associated with any lines may be reused, which may help avoid overflow of the version identifiers. As such, full traversal of the virtual cache 308 for a cache coherency operation may be avoided while at least one version identifier value is associated with no lines. Virtual caches 308 configured to efficiently remove old lines and/or use the version identifiers in removing old lines may rarely require full traversal of the virtual cache 308 for a cache coherency operation, if ever.

Figure 11:
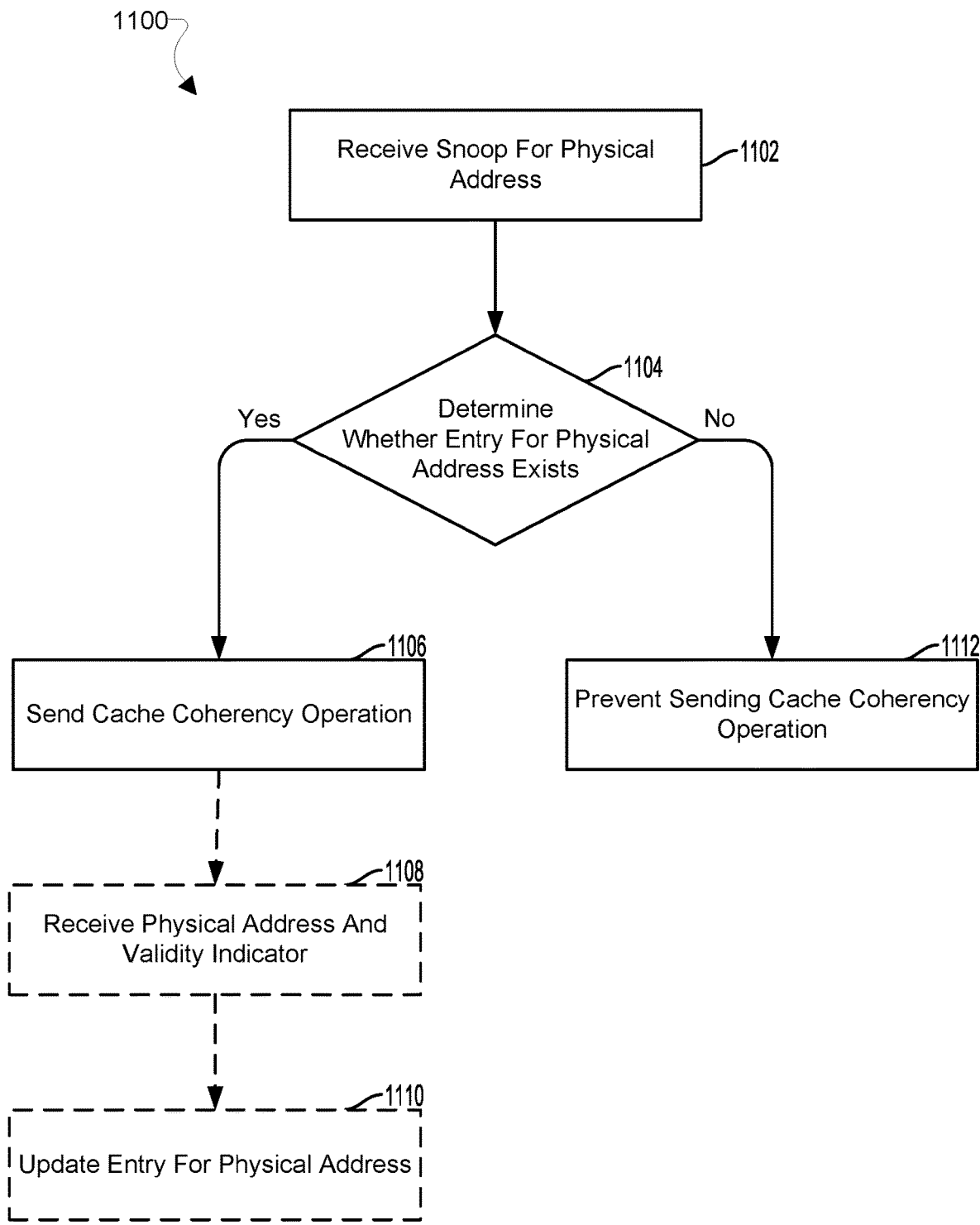
FIG. 11 is a process flow diagram illustrating a method for virtual cache coherency according to an embodiment.

FIG. 11 illustrates a method 1100 for virtual cache coherency according to an embodiment. With reference to FIGS. 1-10, the method 1100 may be implemented in a computing device (e.g., computing device 100 in FIG. 1), in hardware (e.g., processor 124 in FIG. 1, processor 200 in FIG. 2, physical address coherent interconnect 302, snoop filter 304, SMMU 306, virtual cache 308, processor core 310 in FIGS. 3-5, 9, and 10, physical cache 402 in FIG. 4), in software executing in a processor (e.g., processor 124 in FIG. 1, processor 200 in FIG. 2, snoop filter 304, SMMU 306, virtual cache 308, processor core 310 in FIGS. 3-5, 9, and 10), or in a combination of a software-configured processor and dedicated hardware, such as a processor executing software within a virtual cache coherency system (e.g., virtual cache coherency system 300 in FIG. 3, virtual cache coherency system 400 in FIG. 4, virtual cache coherency system 1000 in FIG. 10) that includes other individual components, and various memory/cache controllers. In order to encompass the alternative configurations enabled in various embodiments, the hardware implementing the method 1100 is referred to herein as an "snoop device."

In block 1102, the snoop device may receive a snoop for a physical address. The snoop may be received from a processing device (e.g., CPU 104, processor 124 in FIG. 1, processor 200, processor core 202, 204, 206, 208 in FIG. 2) via a physical address coherent interconnect. The physical address may be for a location in a physical cache (e.g., private processor core cache 210, 212, 214, 216, shared processor core cache 220, 222, processor shared cache 220, shared system cache 240 in FIG. 2) accessible by the processing device. In some embodiments, a snoop filter may receive the snoop for the physical address in block 1102.

In determination block 1104, the snoop device may determine whether an entry for the physical address exists in the snoop filter. Entries in the snoop filter may include parts of physical addresses (e.g., physical address 610 in FIGS. 6 and 7) that correspond to lines stored at virtual addresses (e.g., virtual address 600 in FIGS. 6 and 7) in a virtual cache. The entries in the snoop device may include a physical address tag (e.g., physical address tag 612 in FIGS. 6 and 7, physical address tag 802 in FIGS. 8A and 8B). In some embodiments, the entries in the snoop device may further include index (e.g., index 614 in FIGS. 6 and 7) and/or line (e.g., line 616 in FIGS. 6 and 7) information. The snoop device may compare any combination of the physical address tag, index, and/or line information of the physical address of the snoop and of the entries in the snoop filter. Matching physical address tag, index, and/or line information between the physical address of the snoop and the entries in the snoop filter may indicate to the snoop device that an entry exists in the snoop filter for the physical address of the snoop. In some embodiments, the snoop filter may determine whether an entry for the physical address exists in the snoop filter in determination block 1104.

In response to determining an entry for the physical address exists in the snoop filter (i.e., determination block 1104="Yes"), the snoop filter device may send a cache coherency operation to a virtual cache in block 1106. The cache coherency operation may depend on the type of snoop received. For example, a write snoop may be associated with an invalidate cache coherency operation and a read snoop may be associated with a flush cache coherency operation. In some embodiments, no physical and/or virtual address information may accompany the cache coherency operation, and the cache coherency operation may be applied to all lines in the virtual cache. In some embodiments, the cache coherency operation may also include physical and/or virtual address information for indicating to the virtual cache the line and/or lines in the virtual cache matching criteria for which to implement the cache coherency operation. For example, the physical and/or virtual address information may be from the entry in the snoop filter matching the physical address of the snoop and may include any combination of index and/or line information from a physical address and/or portions of a virtual address tag (e.g., portion of virtual address tag 702 in FIG. 7), index (e.g., index 604 in FIGS. 6 and 7), line (e.g., line 606 in FIGS. 6 and 7), and/or way (e.g., way 608 in FIGS. 6 and 7) information. As another example, the physical address information may be from the snoop, including index and/or line information. In some embodiments, the snoop filter may send the cache coherency operation to the virtual cache in block 1106.

In optional block 1108, the snoop device may receive a physical address and a validity indicator. The physical address and the validity indicator may be received from the virtual cache via an SMMU. In some embodiments, the snoop device may also receive way information for the line in the virtual cache and/or a portion of the virtual address tag. The virtual cache may send a virtual address, validity indicator, way information, and/or portion of the virtual address tag following implementation of the cache coherency operation, as described further herein for block 1218 of the method 1200a with reference to FIG. 12A. The SMMU may translate the virtual address to the physical address and forward the physical address and the validity indicator to the snoop device. In some embodiments, the SMMU may forward the way information and/or the portion of the virtual address tag. In some embodiments, the snoop filter may receive the physical address and the validity indicator in optional block 1108. In some embodiments, the snoop filter may receive the way information and/or the portion of the virtual address tag in optional block 1108.

In optional block 1110, the snoop device may update the entry for the physical address. In some embodiments, the snoop device may remove the entry for the physical address when the validity indicator indicates to the snoop device that the line at the physical address is invalid. In some embodiments, the snoop device may implement aliasing and the entry for the physical address may include any number of counters configured to indicate to the snoop device how many lines in the virtual cache are associated with the physical address. The counters may be configured to track specific conditions of the lines in the virtual cache, such as the line being in a specific set or way in the virtual cache. The snoop device may update the entry in the snoop filter by reducing a counter for which the physical address meets the specific condition of the counter and for which the validity indicator indicates to the snoop device that the line at the physical address is invalid. When the counter is reduced to the point where the counter indicates to the snoop device that no lines in the virtual cache are associated with the physical address, the snoop device may remove the entry for the physical address from the snoop filter. In some embodiments, the snoop filter may update the entry for the physical address in optional block 1110.

In response to determining an entry for the physical address does not exist in the snoop filter (i.e., determination block 1104="No"), the snoop filter device may prevent sending a cache coherency operation to the virtual cache in block 1112. In some embodiments, the snoop filter device may prevent sending a cache coherency operation through inaction, such as not sending the cache coherency operation to the virtual cache. In some embodiments, the snoop filter may prevent sending a cache coherency operation to the virtual cache in block 1112

Figure 12A:
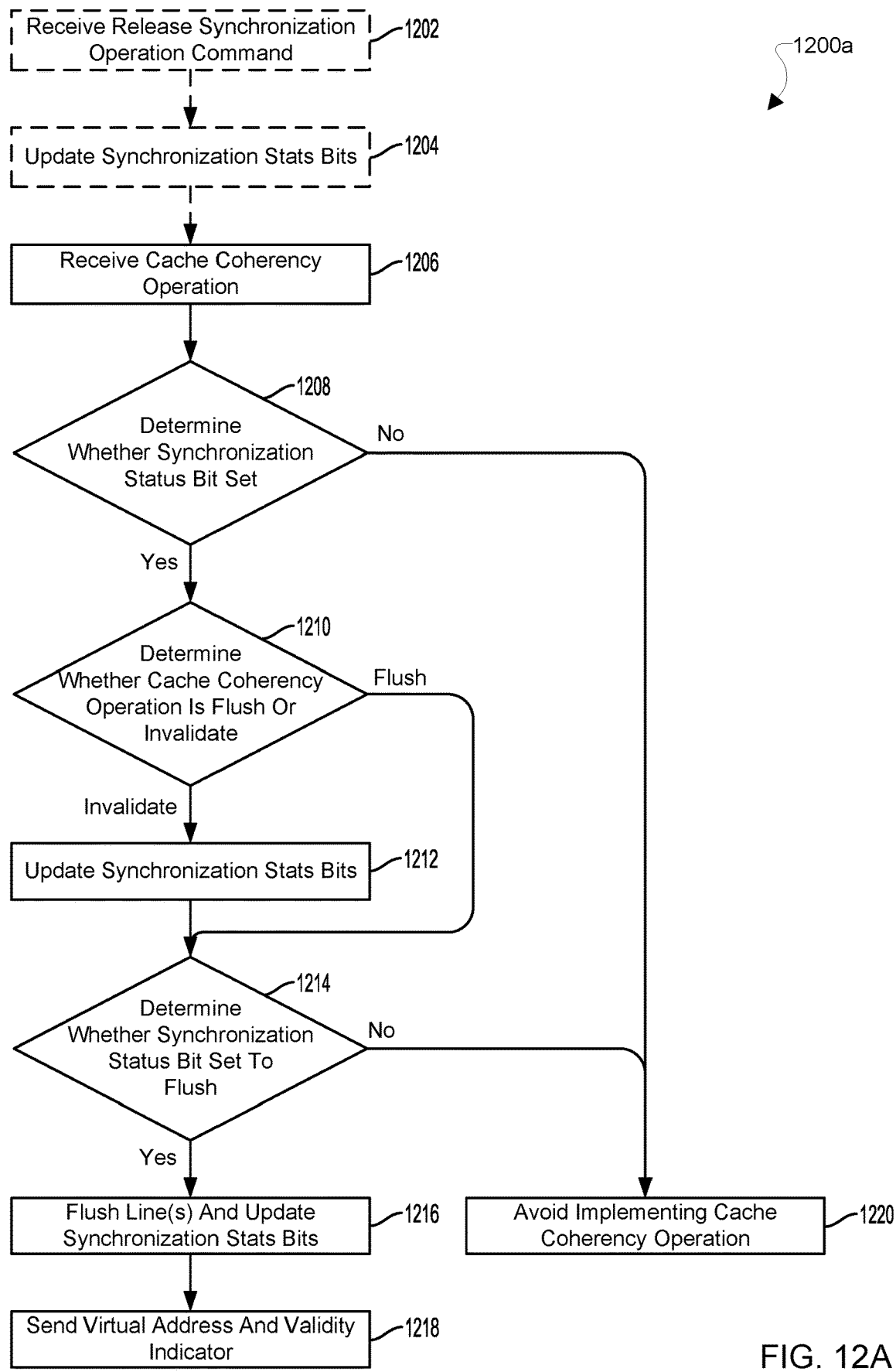
FIGS. 12A and 12B are process flow diagrams illustrating methods for virtual cache coherency according to some embodiments.
Figure 12B:
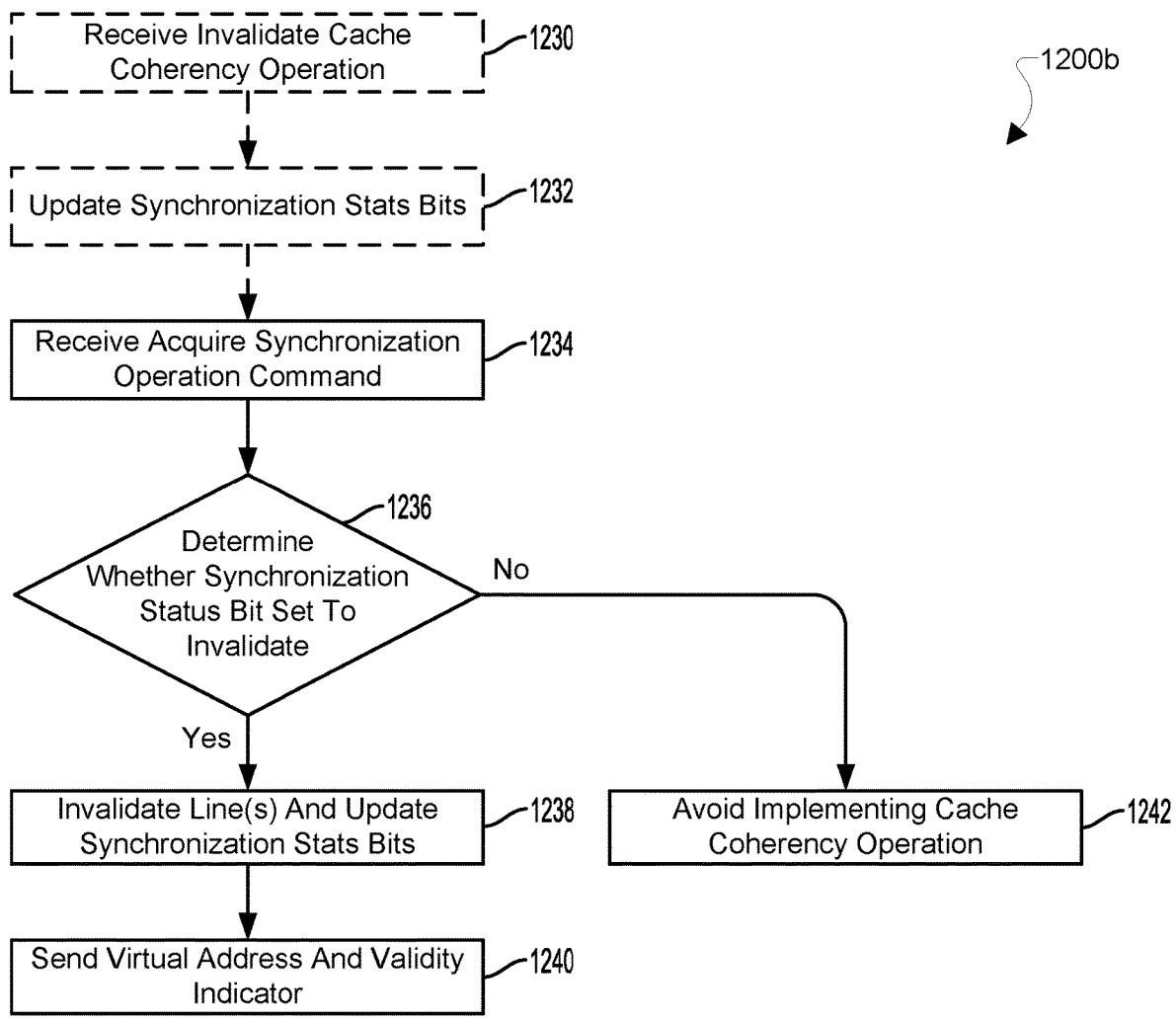

FIGS. 12A and 12B illustrate methods 1200a, 1200b for virtual cache coherency according to an embodiment. With reference to FIGS. 1-11, the methods 1200a, 1200b may be implemented in a computing device (e.g., computing device 100 in FIG. 1), in hardware (e.g., processor 124 in FIG. 1, processor 200 in FIG. 2, physical address coherent interconnect 302, snoop filter 304, SMMU 306, virtual cache 308, processor core 310 in FIGS. 3-5, 9, and 10, physical cache 402 in FIG. 4), in software executing in a processor (e.g., processor 124 in FIG. 1, processor 200 in FIG. 2, snoop filter 304, SMMU 306, virtual cache 308, processor core 310 in FIGS. 3-5, 9, and 10), or in a combination of a software-configured processor and dedicated hardware, such as a processor executing software within a virtual cache coherency system (e.g., virtual cache coherency system 300 in FIG. 3, virtual cache coherency system 400 in FIG. 4, virtual cache coherency system 1000 in FIG. 10) that includes other individual components, and various memory/cache controllers. In order to encompass the alternative configurations enabled in various embodiments, the hardware implementing the methods 1200a, 1200b is referred to herein as an "virtual cache device." In some embodiments, the methods 1200a, 1200b may be implemented jointly or separately. In some embodiments, any part of the methods 1100, 1200a, 1200b may be implemented in parallel.

Referring to FIG. 12A, in optional block 1202 in the method 1200a, the virtual cache device may receive a release synchronization operation command from a processor core (e.g., processor 124 in FIG. 1, processor 200 in FIG. 2, processor core 310 in FIGS. 3, 6, 10) or other coherent processing device. The release synchronization operation command may be to atomically release at least a portion of a virtual cache. In some embodiments, the virtual cache may receive the release synchronization operation command from the processor core or other coherent processing device in optional block 1202.

In optional block 1204, the virtual cache device may update synchronization status bits for lines in the virtual cache subject to the release synchronization operation command. The synchronization status bits may indicate to the virtual cache device whether there is a pending synchronization operation and what type of cache coherence operation to implement in response to receiving a cache coherence operation while a synchronization operation is pending. In response to a release synchronization operation command for a line, the virtual cache device may set the synchronization status bits to indicate to the virtual cache device a need to flush the line. In some embodiments, the virtual cache may update the synchronization status bits for lines in the virtual cache subject to the synchronization operation command in optional block 1204.

In block 1206, the virtual cache device may receive a cache coherency operation. The cache coherency operation my correspond to a type of snoop received by a snoop filter. For example, the cache coherency operation may be an invalidate operation in response to a write snoop and a flush operation in response to a read snoop. In some embodiments, no physical address (e.g., physical address 610 in FIGS. 6 and 7) and/or virtual address (e.g., virtual address 600 in FIGS. 6 and 7) information may accompany the cache coherency operation. In some embodiments, the cache coherency operation may also include physical and/or virtual address information for indicating to the virtual cache device the line in the virtual cache for which to implement the cache coherency operation. For example, the physical and/or virtual address information may be from an entry in a snoop filter matching the physical address of a snoop and may include any combination of index (e.g., index 614 in FIGS. 6 and 7) and/or line (e.g., line 616 in FIGS. 6 and 7) information from a physical address and/or portions of a virtual address tag (e.g., portion of virtual address tag 702 in FIG. 7), index (e.g., index 604 in FIGS. 6 and 7), line (e.g., line 606 in FIGS. 6 and 7), and/or way (e.g., way 608 in FIGS. 6 and 7) information. As another example, the physical address information may be from the snoop, including index and/or line information. The physical and/or virtual address information may indicate to the virtual cache device locations in a virtual for which to implement the cache coherency operation. In some embodiments, the virtual cache may receive the cache coherency operation in block 1206.

In determination block 1208, the virtual cache device may determine whether one or more synchronization status bits are set for a line subject to the cache coherency operation. In some embodiments, all lines in the virtual cache may be subject to the cache coherency operations, such as when the cache coherency operation does not specify any physical and/or virtual address information. In some embodiments, the lines in the virtual cache that may be subject to the cache coherency operation may be lines at locations in the virtual cache that correspond to physical and/or virtual address information specified with the cache coherency operation. The virtual cache device may check the synchronization status bits for lines and/or groups of lines subject to the cache coherency operation to determine whether the synchronization status bits are set. The synchronization status bits may jointly or independently indicate a type of cache coherency operation that the location in the virtual cache may be subject to. In some embodiments, the virtual cache device may check the synchronization status bits for the type of cache coherency operation for a location in the virtual cache. In some embodiments, the virtual cache device may check all the synchronization status bits for a location in the virtual cache. In some embodiments, the virtual cache may determine whether a synchronization status bit is set for a line subject to the cache coherency operation in determination block 1208.

Following receiving a cache coherency operation in block 1206 or in response to determining that a synchronization status bit is set for a line subject to the cache coherency operation (i.e., determination block 1208="Yes"), the virtual cache device may determine whether the cache coherency operation is an invalidate operation or a flush operation in determination block 1210. The virtual cache device may determine the type of cache coherency operation based on the type of snoop. As described herein, the cache coherency operation my correspond to a type of snoop received by a snoop filter. For example, the cache coherency operation may be an invalidate operation in response to a write snoop and a flush operation in response to a read snoop. In some embodiments, the virtual cache may determine whether the cache coherency operation is an invalidate operation or a flush operation in determination block 1210.

In response to determining that the cache coherency operation is an invalidate operation (i.e., determination block 1210="Invalidate"), the virtual cache device may update the synchronization status bits in block 1212. For an invalidate operation, the virtual cache device may set the synchronization status bits to indicate a need to invalidate a line and/or a group of lines at a location in the virtual cache. The virtual cache device may update the synchronization status bits of each line subject to the cache coherency operation to set the synchronization status bits for those lines to indicate a need to invalidate. In some embodiments, the virtual cache may update the synchronization status bits in block 1212.

In response to determining that the cache coherency operation is a flush operation (i.e., determination block 1210="Flush"), and/or following updating the synchronization status bits in block 1212, the virtual cache device may determine whether the synchronization status bits are set to indicate a need to flush in determination block 1214. The virtual cache device may check the synchronization status bits of each line subject to the cache coherency operation to determine whether the synchronization status bits for those lines are set to indicate a need to flush. In some embodiments, the virtual cache may determine whether the synchronization status bits are set to indicate a need to flush in determination block 1214.

In response to determining that the synchronization status bits are set to indicate a need to flush (i.e., determination block 1214="Yes"), the virtual cache device may flush the lines in the virtual cache and update the synchronization status bits in block 1216. In some embodiments, such as when the cache coherency operation does not specify any physical address, virtual address and/or way information, the virtual cache device may flush all lines in the virtual cache. In some embodiments, such as when the cache coherency operation does not specify any physical address, virtual address and/or way information, the virtual cache device may flush all dirty lines in the virtual cache. In some embodiments, such as when the cache coherency operation does specify physical and/or virtual address information, the virtual cache device may flush the lines in the virtual cache that correspond to the physical and/or virtual address information. In some embodiments, such as when the lines in the virtual cache include synchronization status bits, the virtual cache device may flush all lines in the virtual cache and/or flush the lines in the virtual cache that correspond to the physical and/or virtual address information for which the synchronization status bits are set to indicate a need to flush. In some embodiments, the synchronization status bits for the flushed lines may be updated so as to clear the indication of a need to flush the line. In some embodiments, the virtual cache may flush the lines and updated the synchronization status bits in the virtual cache in block 1216.

In block 1218, the virtual cache device may send one or more virtual addresses and one or more validity indicators. The virtual addresses and the validity indicators may be sent to the snoop filter via an SMMU. The SMMU may translate the virtual addresses to physical addresses and forward the physical addresses and the validity indicators to the snoop filter. The snoop filter may receive the physical addresses and validity indicators, as described further herein for block 1108 of the method 1100 with reference to FIG. 11. In some embodiments, the virtual cache may send the virtual addresses and the validity indicators in block 1218.

In response to determining that a synchronization status bit is not set for a line subject to the cache coherency operation (i.e., determination block 1208="No"), and/or in response to determining that the synchronization status bits are not set to indicate a need to flush (i.e., determination block 1214="No"), the virtual cache device may avoid implementing the cache coherency operations in block 1220. The virtual cache device may avoid implementing the cache coherency operations for any lines in the virtual cache that meet at least one of the criteria in determination blocks 1208, 1214. In some embodiments, the virtual cache device may avoid implementing the cache coherency operations through inaction. In some embodiments, the virtual cache may avoid implementing the cache coherency operations in block 1220.

Referring to FIG. 12B, in optional block 1230 of the method 1200*b*, the virtual cache device may receive an invalidate cache coherency operation. The invalidate cache coherency operation my correspond to a type of snoop received by a snoop filter. For example, the cache coherency operation may be an invalidate operation in response to a write snoop. In some embodiments, no physical address (e.g., physical address 610 in FIGS. 6 and 7) and/or virtual address (e.g., virtual address 600 in FIGS. 6 and 7) information may accompany the cache coherency operation. In some embodiments, the cache coherency operation may also include physical and/or virtual address information for indicating to the virtual cache device the line in the virtual cache for which to implement the cache coherency operation. For example, the physical and/or virtual address information may be from an entry in a snoop filter matching the physical address of a snoop and may include any combination of index (e.g., index 614 in FIGS. 6 and 7) and/or line (e.g., line 616 in FIGS. 6 and 7) information from a physical address and/or portions of a virtual address tag (e.g., portion of virtual address tag 702 in FIG. 7), index (e.g., index 604 in FIGS. 6 and 7), line (e.g., line 606 in FIGS. 6 and 7), and/or way (e.g., way 608 in FIGS. 6 and 7) information. As another example, the physical address information may be from the snoop, including index and/or line information. The physical and/or virtual address information may indicate to the virtual cache device the locations in a virtual cache in which to implement the invalidate cache coherency operation. In some embodiments, the virtual cache may receive the invalidate cache coherency operation in optional block 1230.

In optional block 1232, the virtual cache device may update synchronization status bits for lines in the virtual cache subject to the invalidate cache coherency operation. The synchronization status bits may indicate to the virtual cache device whether there is a pending invalidate cache coherency and what type of cache coherence operation to implement in response to receiving a synchronization operation command while an invalidate cache coherence operation is pending. In response to an invalidate cache coherence operation for a line, the virtual cache device may set the synchronization status bits to indicate to the virtual cache device a need to invalidate the line. In some embodiments, the virtual cache may update the synchronization status bits for lines in the virtual cache subject to an invalidate cache coherence operation in optional block 1232.

In block 1234, the virtual cache device may receive an acquire synchronization operation command from a processor core (e.g., processor 124 in FIG. 1, processor 200 in FIG. 2, processor core 310 in FIGS. 3, 6, 10) or other coherent processing device. The acquire synchronization operation may be to atomically acquire at least a portion of a virtual cache. In some embodiments, the virtual cache may receive the acquire synchronization operation command from the processor core or other coherent processing device in block 1234.

In determination block 1236, the virtual cache device may determine whether the synchronization status bits are set to indicate a need to invalidate. The virtual cache device may check the synchronization status bits of each line subject to the cache coherency operation to determine whether the synchronization status bits for those lines are set to indicate a need to invalidate. In some embodiments, the virtual cache may determine whether the synchronization status bits are set to indicate a need to invalidate in determination block 1236.

In response to determining that the synchronization status bits are set to indicate a need to invalidate (i.e., determination block 1236="Yes"), the virtual cache device may invalidate the lines in the virtual cache and update the synchronization status bits in block 1238. In some embodiments, such as when the cache coherency operation does not specify any physical address, virtual address and/or way information, the virtual cache device may invalidate all lines in the virtual cache and flush all dirty lines in the virtual cache. In some embodiments, such as when the cache coherency operation does not specify any physical address, virtual address and/or way information, the virtual cache device may invalidate all clean lines in the virtual cache and flush all dirty lines in the virtual cache. For example, when dirty lines are held exclusive or known to be entirely dirty, such as when dirty status is tracked such as by byte enables, the virtual cache device may flush dirty lines without invalidating the dirty lines. In some embodiments, such as when the cache coherency operation does specify physical and/or virtual address information, the virtual cache device may invalidate the lines in the virtual cache that correspond to the physical and/or virtual address information. In some embodiments, such as when the lines in the virtual cache include synchronization status bits, the virtual cache device may invalidate all lines in the virtual cache and/or invalidate the lines in the virtual cache that correspond to the physical and/or virtual address information for which the synchronization status bits are set to indicate a need to invalidate. In some embodiments, the synchronization status bits for the invalidated lines may be updated so as to clear the indication of a need to invalidate the line. In some embodiments, the virtual cache may invalidate the lines and updated the synchronization status bits in the virtual cache in block 1238.

In block 1240, the virtual cache device may send one or more virtual addresses and one or more validity indicators. The virtual addresses and the validity indicators may be sent to the snoop filter via an SMMU. The SMMU may translate the virtual addresses to physical addresses and forward the physical addresses and the validity indicators to the snoop filter. The snoop filter may receive the physical addresses and validity indicators, as described further herein for block 1108 of the method 1100 with reference to FIG. 11. In some embodiments, the virtual cache may send the virtual addresses and the validity indicators in block 1240.

In response to determining that the synchronization status bits are not set to indicate a need to invalidate (i.e., determination block 1236="No"), the virtual cache device may avoid implementing the invalidate cache coherency operation in block 1242. The virtual cache device may avoid implementing the invalidate cache coherency operation for any lines in the virtual cache that do not have synchronization status bits set to indicate a need to invalidate. In some embodiments, the virtual cache device may avoid implementing the invalidate cache coherency operation through inaction. In some embodiments, the virtual cache may avoid implementing the invalidate cache coherency operation in block 1242.

In some embodiments, the method 1100 and the methods 1200a, 1200b may be implemented as corresponding methods. As such data sent and received by the snoop device during execution of the method 1100 may be sent to and received from the virtual cache device during execution of the methods 1200a, 1200b. Similarly, data sent and received by the virtual cache device during execution of the methods 1200a, 1200b may be sent to and received from the snoop device during execution of the method 1100.

Figure 13A:
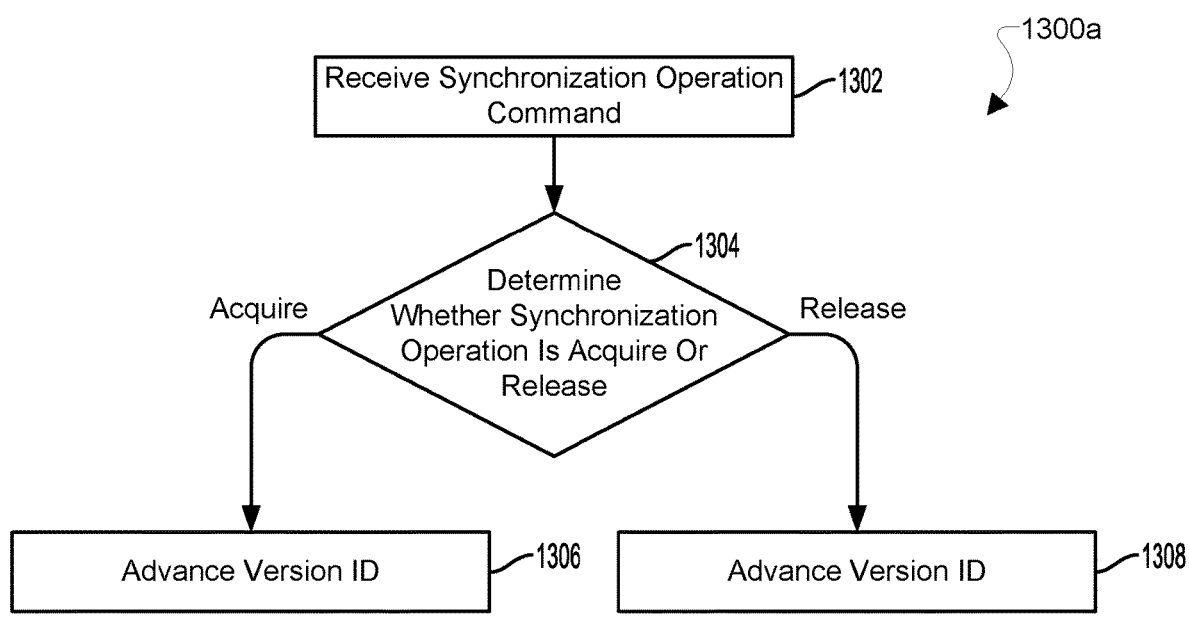
FIGS. 13A, 13B, and 13C are process flow diagrams illustrating method for virtual cache coherency according to some embodiments.
Figure 13B:
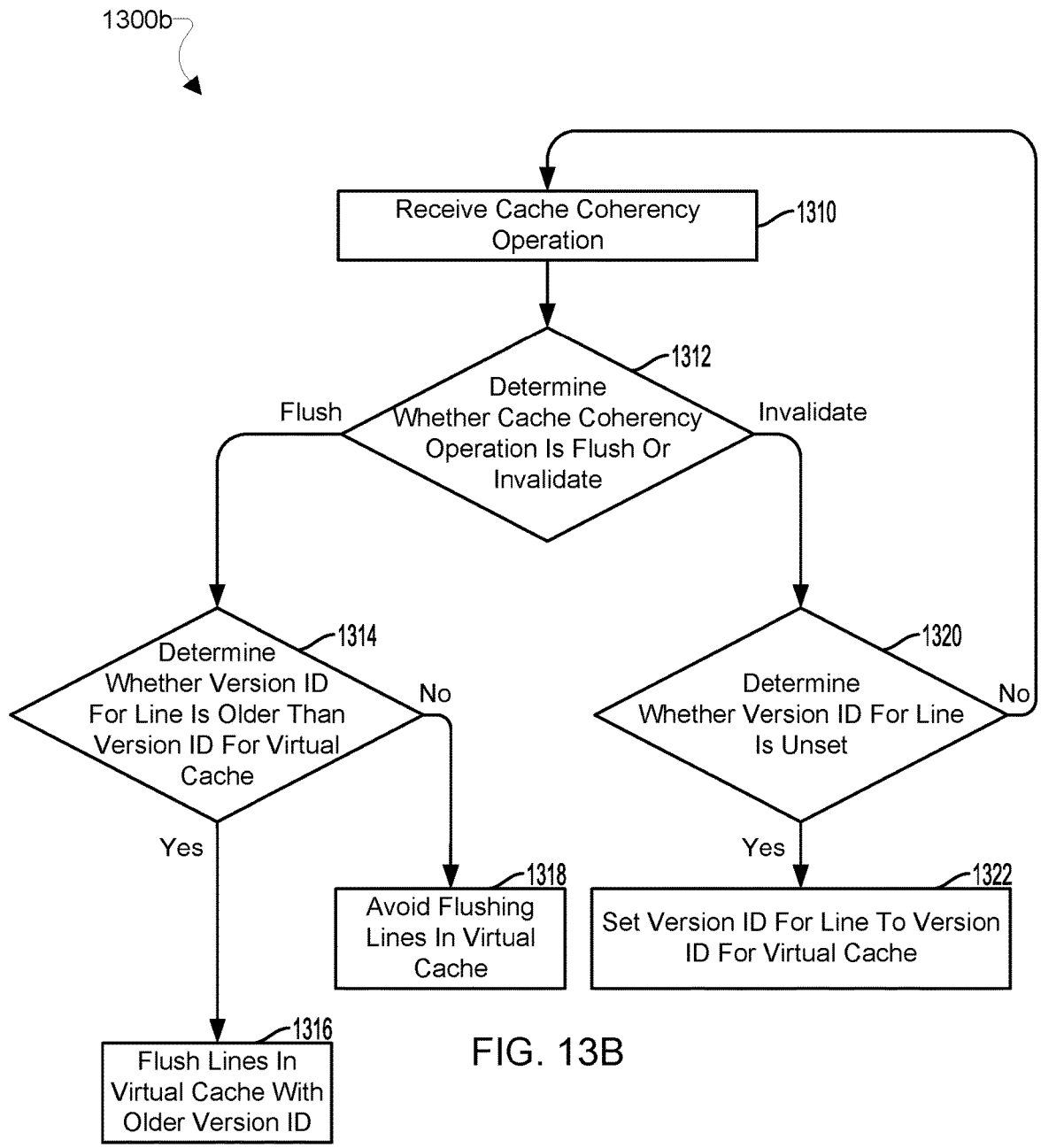
Figure 13C:
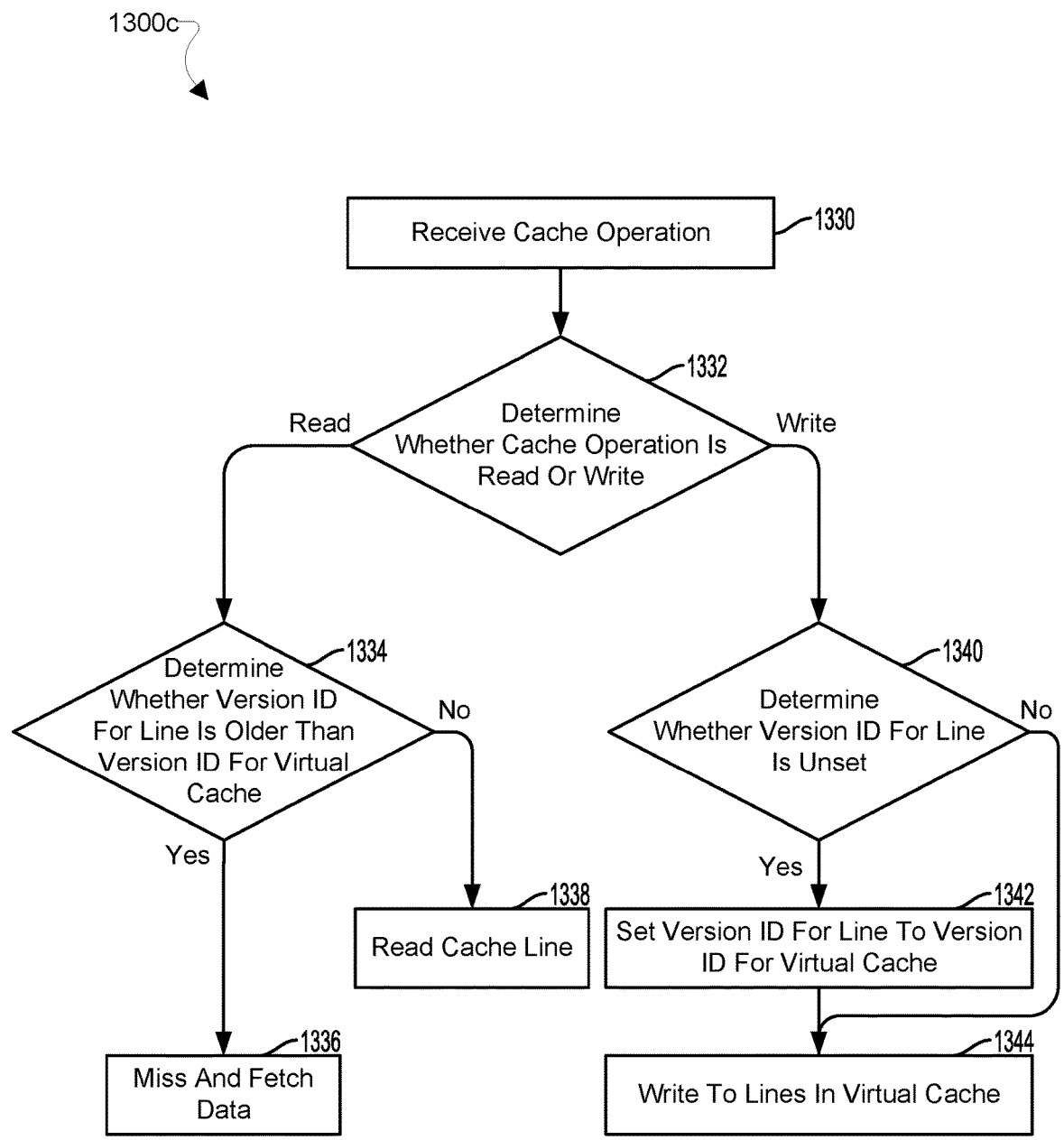

FIGS. 13A, 13B, 13C illustrate methods 1300a, 1300b, 1300c for virtual cache coherency according to an embodiment. With reference to FIGS. 1-13C, the methods 1300a, 1300b, 1300c may be implemented in a computing device (e.g., computing device 100 in FIG. 1), in hardware (e.g., processor 124 in FIG. 1, processor 200 in FIG. 2, physical address coherent interconnect 302, snoop filter 304, SMMU 306, virtual cache 308, processor core 310 in FIGS. 3-5, 9, and 10, physical cache 402 in FIG. 4), in software executing in a processor (e.g., processor 124 in FIG. 1, processor 200 in FIG. 2, snoop filter 304, SMMU 306, virtual cache 308, processor core 310 in FIGS. 3-5, 9, and 10), or in a combination of a software-configured processor and dedicated hardware, such as a processor executing software within a virtual cache coherency system (e.g., virtual cache coherency system 300 in FIG. 3, virtual cache coherency system 400 in FIG. 4, virtual cache coherency system 1000 in FIG. 10) that includes other individual components, and various memory/cache controllers. In order to encompass the alternative configurations enabled in various embodiments, the hardware implementing the methods 1300a, 1300b, 1300c is referred to herein as an "virtual cache device." In some embodiments, the methods 1300a, 1300b, 1300c may be implemented jointly and/or separately. In some embodiments, any part of the methods 1100, 1200a, 1200b, 1300a, 1300b, 1300c may be implemented in parallel.

Refereeing FIG. 13A, in block 1302 of the method 1300a, the virtual cache device may receive a synchronization operation command from a processor core (e.g., processor 124 in FIG. 1, processor 200 in FIG. 2, processor core 310 in FIGS. 3, 6, 10) or other coherent processing device. The synchronization operation may be to atomically acquire and/or release at least a portion of a virtual cache. In some embodiments, the virtual cache may receive the synchronization operation command from the processor core or other coherent processing device in optional block 1302.

In determination block 1304, the virtual cache device may determine whether the synchronization operation is an acquire synchronization operation or a flush synchronization operation. The received synchronization operation command may contain an indication of the type of synchronization operation. The virtual cache device may interpret the indication of the type of synchronization operation to determine whether the synchronization operation is an acquire synchronization operation or a flush synchronization operation. In some embodiments, the virtual cache may determine whether the synchronization operation is an acquire synchronization operation or a flush synchronization operation in determination block 1304.

In response to determining that the synchronization operation is an acquire synchronization operation (i.e., determination block 1304="Acquire"), the virtual cache device may advance a version identifier (ID) for the virtual cache in block 1306. In some embodiments, advancing the version ID may include changing the version ID in a manner such that the version ID indicates a newer version than a previous version according to a policy, algorithm, etc. In some embodiments, the version ID for the virtual cache may be a value for flushing, or flushing and invalidating lines in the virtual cache 308. In some embodiments, the virtual cache may advance the version ID for the virtual cache in block 1306.

In response to determining that the synchronization operation is a release synchronization operation (i.e., determination block 1304="Release"), the virtual cache device may advance a version identifier (ID) for the virtual cache in block 1308. In some embodiments, advancing the version ID may include changing the version ID in a manner such that the version ID indicates a newer version than a previous version according to a policy, algorithm, etc. In some embodiments, the version ID for the virtual cache may be a value for invalidating, or flushing and invalidating lines in the virtual cache 308. In some embodiments, the virtual cache may advance the version ID for the virtual cache in block 1308.

Referring to FIG. 13B, in block 1310 of the method 1300b, the virtual cache device may receive a cache coherency operation from a snoop filter. The cache coherency operation may be to flush and/or invalidate at least a portion of a virtual cache. In some embodiments, the virtual cache may receive the cache coherency operation from the snoop filter in block 1310.

In determination block 1312, the virtual cache device may determine whether the cache coherency operation is a flush operation or an invalidate operation. The virtual cache device may determine the type of cache coherency operation based on information in the cache coherency operation configured to indicate to the virtual cache device the type of cache coherency operation. In some embodiments, the type of cache coherency operation received by the virtual cache device may be based on a type of snoop received by a snoop filter and a cache coherency operation issued by the snoop filter in response to the snoop. As described herein, the cache coherency operation may correspond to a type of snoop received by a snoop filter. For example, the cache coherency operation may be an invalidate operation in response to a write snoop and a flush operation in response to a read snoop. In some embodiments, the virtual cache may determine whether the cache coherency operation is an invalidate operation or a flush operation in determination block 1312.

In response to determining that the cache coherency operation is a flush operation (i.e., determination block 1312="Flush"), the virtual cache device may determine whether a version ID for lines in the virtual cache subject to the flush operation is older than a version ID for the virtual cache in determination block 1314. In some embodiments, the version ID for the lines in the virtual cache and/or for the virtual cache may be a version ID for invalidating and/or flushing and invalidating lines in the virtual cache. The version ID may have a value configured to indicate the version of the line and/or the virtual cache. The virtual cache device may compare the version ID of the lines and the version ID of the virtual cache to determine which of the version IDs is older. For example, the version ID having a lower value may be an older version ID. As another example, the version ID of the lines may be an older version ID when different from the version ID of the virtual cache, while not being unset. In some embodiments, the virtual cache may determine whether the version ID for the lines in the virtual cache subject to the flush operation is older than the version ID for the virtual cache in determination block 1314.

In response to determining that the version ID for the lines in the virtual cache subject to the flush operation is older than the version ID for the virtual cache (i.e., block 1314="Yes"), the virtual cache device may flush the cache lines having the an older version ID than the version ID of the virtual cache in block 1316. The virtual cache device may identify the lines in the virtual cache in which to implement the flush operation in determination block 1314, and implement the flush operations for the identified lines in block 1316. As such, flushing of any lines with an unset version ID, a new version ID, or a version ID equal to the version ID of the virtual cache may be avoided. In some embodiments, the virtual cache may flush the cache lines having the older version ID than the version ID of the virtual cache in block 1316.

In response to determining that the version ID for the lines in the virtual cache subject to the flush operation is not older than the version ID for the virtual cache (i.e., block 1314="No"), the virtual cache device may not flush any cache lines in the virtual cache in block 1318. In some embodiments, the virtual cache device may avoid flushing any cache lines in the virtual cache through inaction in response to the flush operation. In some embodiments, the virtual cache device may avoid flushing any cache lines in the virtual cache through attempting and failing to implement the flush operation for cache lines in the virtual cache. In some embodiments, the virtual cache may not flush any cache lines in the virtual cache in block 1318.

In response to determining that the cache coherency operation is an invalidate operation (i.e., determination block 1312="Invalidate"), the virtual cache device may determine whether a version ID for lines in the virtual cache subject to the invalidate operation is unset in determination block 1320. In some embodiments, the version ID for the lines in the virtual cache and/or for the virtual cache may be a version ID for flushing and/or flushing and invalidating lines in the virtual cache. The version ID may have a value configured to indicate the version of the line and/or the virtual cache. The virtual cache device may determine from the value of the version ID whether the version ID of the virtual cache is unset. For example, the version ID may be unset when having a specified value, such as having the value "0". As another example, the version ID may be unset when having no value, such as having the non-value "null". In some embodiments, invalid lines may have unset version IDs. In some embodiments, an unset needs invalidate version ID for a line may remain unset following a write operation, which may trigger setting a need flush version ID. Similarly, in some embodiments, an unset needs flush version ID for a line may remain unset following a read operations. In some embodiments, the virtual cache may determine whether the version ID for lines in the virtual cache subject to the invalidate operation is unset in determination block 1320.

In response to determining that a version ID for lines in the virtual cache subject to the invalidate operation is unset (i.e., determination block 1320="Yes"), the virtual cache device may set the unset version ID to the version ID of the virtual cache in block 1322. As described herein, the version ID for the virtual cache may have a value. The virtual cache device may read the value the version ID for the virtual cache and set the version ID for the lines in the virtual cache having an unset version ID equal to the version ID for the virtual cache. In some embodiments, the virtual cache may set the unset version ID to the version ID of the virtual cache in block 1322.

In response to determining that the version ID for lines in the virtual cache subject to the invalidate operation is not unset (i.e., determination block 1320="No"), the virtual cache device may receive another cache coherency operation from a snoop filter in block 1310.

Referring to FIG. 13C, in block 1330 of the method 1300c, the virtual cache device may receive a cache operation from a snoop filter and/or coherent processing device (e.g., CPU 104, processor 124 in FIG. 1, processor 200 in FIG. 2, processor core 310 in FIGS. 3, 6, 10). The cache operation may be to read from and/or write to at least a portion of a virtual cache. In some embodiments, the virtual cache may receive the cache operation from the snoop filter and/or coherent processing device in block 1330.

In determination block 1332, the virtual cache device may determine whether the cache operation is a read operation or a write operation. The virtual cache device may determine the type of cache operation based on the type of cache operation received in block 1330. In some embodiments, the virtual cache may determine whether the cache operation is a read operation or a write operation in determination block 1332.

In response to determining that the cache operation is a read operation (i.e., determination block 1332="Read"), the virtual cache device may determine whether a version ID for lines in the virtual cache subject to the read operation is older than a version ID for the virtual cache in determination block 1334. In some embodiments, the version ID for the lines in the virtual cache and/or for the virtual cache may be a version ID for flushing and/or flushing and invalidating lines in the virtual cache. The version ID may have a value configured to indicate the version of the line and/or the virtual cache. The virtual cache device may compare the version ID of the lines and the version ID of the virtual cache to determine which of the version IDs is older. For example, the version ID having a lower value may be an older version ID. In some embodiments, the virtual cache may determine whether the version ID for the lines in the virtual cache subject to the read operation is older than the version ID for the virtual cache in determination block 1334.

In response to determining that the version ID for the lines in the virtual cache subject to the read operation is older than the version ID for the virtual cache (i.e., block 1334="Yes"), the virtual cache device may miss for the cache lines having an older version ID than the version ID of the virtual cache, and fetch data from a memory (e.g., memory 106, 114 in FIG. 1) in block 1336. The virtual cache device may identify the lines in the virtual cache in which to implement the read operation in determination block 1334, and miss and fetch data for the identified lines in block 1336. In some embodiments, the virtual cache may read the cache lines having the older version ID than the version ID of the virtual cache in block 1336.

In response to determining that the version ID for the lines in the virtual cache subject to the read operation is not older than the version ID for the virtual cache (i.e., block 1334="No"), the virtual cache device may read the cache lines having a version ID not older than the version ID of the virtual cache in block 1338. The virtual cache device may identify the lines in the virtual cache in which to implement the read operation in determination block 1334, and implement read operations for the identified lines in block 1338. In some embodiments, such as when incomplete data in a line, the virtual cache device may miss and read/merge data. In some embodiments, the virtual cache may read the cache lines not having an older version ID than the version ID of the virtual cache in block 1338.

In response to determining that the cache operation is a write operation (i.e., determination block 1332="Write"), the virtual cache device may determine whether a version ID for lines in the virtual cache subject to the write operation is unset in determination block 1340. In some embodiments, the version ID for the lines in the virtual cache and/or for the virtual cache may be a version ID for invalidating and/or flushing and invalidating lines in the virtual cache. The version ID may have a value configured to indicate the version of the line and/or the virtual cache. The virtual cache device may determine from the value of the version ID whether the version ID of the virtual cache is unset. For example, the version ID may be unset when having a specified value, such as having the value "0". As another example, the version ID may be unset when having no value, such as having the non-value "null". In some embodiments, the virtual cache may determine whether the version ID for lines in the virtual cache subject to the write operation is unset in determination block 1340.

In response to determining that a version ID for lines in the virtual cache subject to the invalidate operation is unset (i.e., determination block 1340="Yes"), the virtual cache device may set the unset version ID to the version ID of the virtual cache in block 1342. As described herein, the version ID for the virtual cache may have a value. The virtual cache device may read the value of the version ID for the virtual cache and set the version ID for the lines in the virtual cache having an unset version ID equal to the version ID for the virtual cache. In some embodiments, the virtual cache may set the unset version ID to the version ID of the virtual cache in block 1342.

In response to determining that the version ID for lines in the virtual cache subject to the write operation is not unset (i.e., determination block 1340="No"), and/or following setting the unset version ID to the version ID of the virtual cache in block 1342, the virtual cache device may write to the cache lines in the virtual cache in block 1344. The virtual cache device may identify the lines in the virtual cache in which to implement the write operation in determination block 1340, and implement write operations for the identified lines in block 1344. In some embodiments, the virtual cache may write to the cache lines in the virtual cache in block 1344.

In some embodiments, the method 1100 and the methods 1300*a*, 1300*b*, 1300*c* may be implemented as corresponding methods. As such, data sent and received by the snoop device during execution of the method 1100 may be sent to and received from the virtual cache device during execution of the methods 1300*a* 1300*b*, 1300*c*. Similarly, data sent and received by the virtual cache device during execution of the methods 1300*a*, 1300*b*, 1300*c* may be sent to and received from the snoop device during execution of the method 1100.

Figure 14:
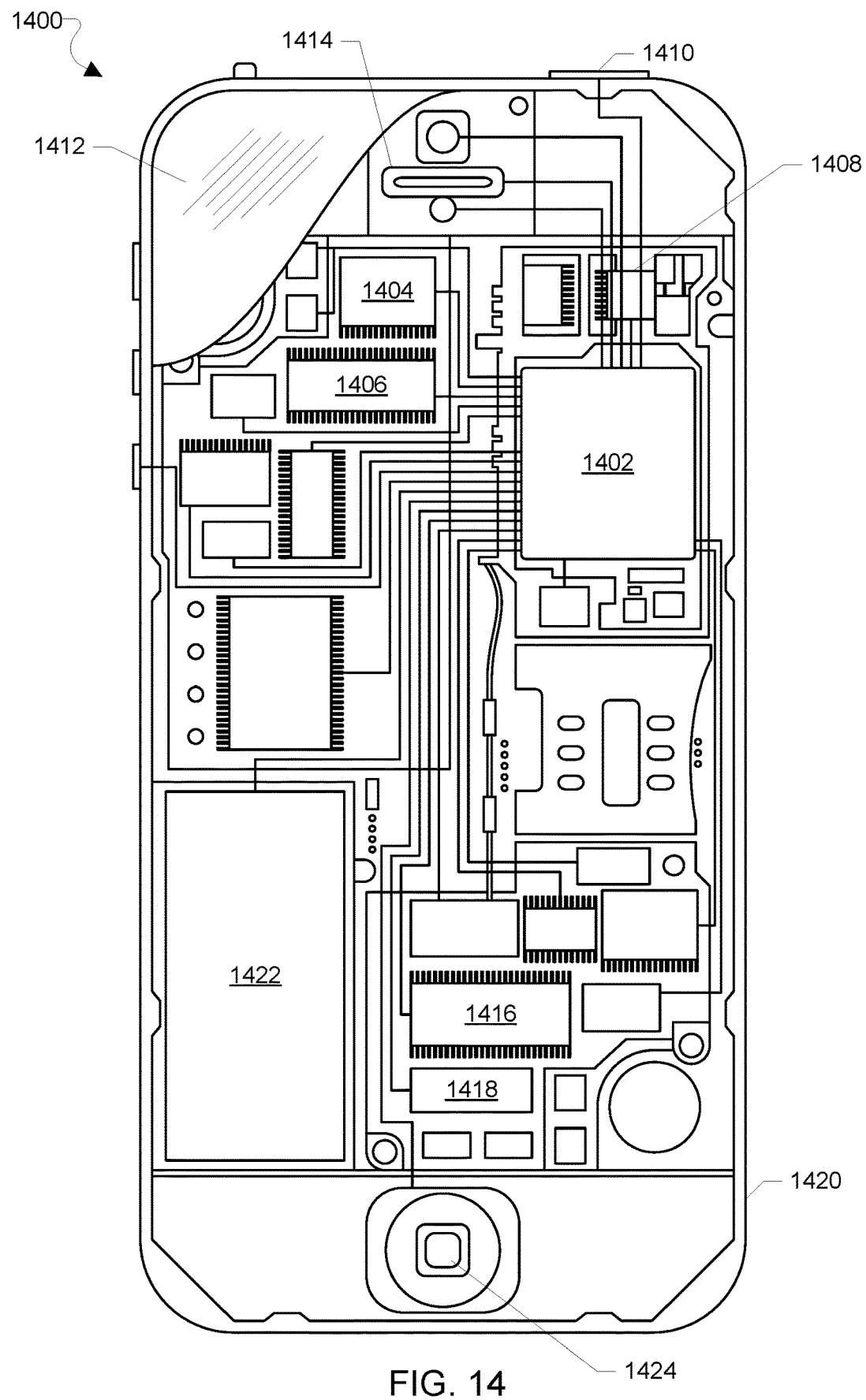
FIG. 14 is a component block diagram illustrating an example mobile computing device suitable for implementing a virtual cache coherency system in accordance with the various embodiments.

A virtual cache coherency system in accordance with the various embodiments (including, but not limited to, embodiments described above with reference to FIGS. 1-13C) may be implemented in a wide variety of computing systems including mobile computing devices, an example of which suitable for use with the various embodiments is illustrated in FIG. 14. The mobile computing device 1400 may include a processor 1402 coupled to a touchscreen controller 1404 and an internal memory 1406. The processor 1402 may be one or more multicore integrated circuits designated for general or specific processing tasks. The internal memory 1406 may be volatile or non-volatile memory, and may also be secure and/or encrypted memory, or unsecure and/or unencrypted memory, or any combination thereof. Examples of memory types that can be leveraged include but are not limited to DDR, LPDDR, GDDR, WIDEIO, RAM, SRAM, DRAM, P-RAM, R-RAM, M-RAM, STT-RAM, and embedded DRAM. The touchscreen controller 1404 and the processor 1402 may also be coupled to a touchscreen panel 1412, such as a resistive-sensing touchscreen, capacitive-sensing touchscreen, infrared sensing touchscreen, etc. Additionally, the display of the mobile computing device 1400 need not have touch screen capability.

The mobile computing device 1400 may have one or more radio signal transceivers 1408 (e.g., Peanut, Bluetooth, ZigBee, Wi-Fi, RF radio) and antennae 1410, for sending and receiving communications, coupled to each other and/or to the processor 1402. The transceivers 1408 and antennae 1410 may be used with the above-mentioned circuitry to implement the various wireless transmission protocol stacks and interfaces. The mobile computing device 1400 may include a cellular network wireless modem chip 1416 that enables communication via a cellular network and is coupled to the processor.

The mobile computing device 1400 may include a peripheral device connection interface 1418 coupled to the processor 1402. The peripheral device connection interface 1418 may be singularly configured to accept one type of connection, or may be configured to accept various types of physical and communication connections, common or proprietary, such as Universal Serial Bus (USB), FireWire, Thunderbolt, or PCIe. The peripheral device connection interface 1418 may also be coupled to a similarly configured peripheral device connection port (not shown).

The mobile computing device 1400 may also include speakers 1414 for providing audio outputs. The mobile computing device 1400 may also include a housing 1420, constructed of a plastic, metal, or a combination of materials, for containing all or some of the components described herein. The mobile computing device 1400 may include a power source 1422 coupled to the processor 1402, such as a disposable or rechargeable battery. The rechargeable battery may also be coupled to the peripheral device connection port to receive a charging current from a source external to the mobile computing device 1400. The mobile computing device 1400 may also include a physical button 1424 for receiving user inputs. The mobile computing device 1400 may also include a power button 1424 for turning the mobile computing device 1400 on and off.

Figure 15:
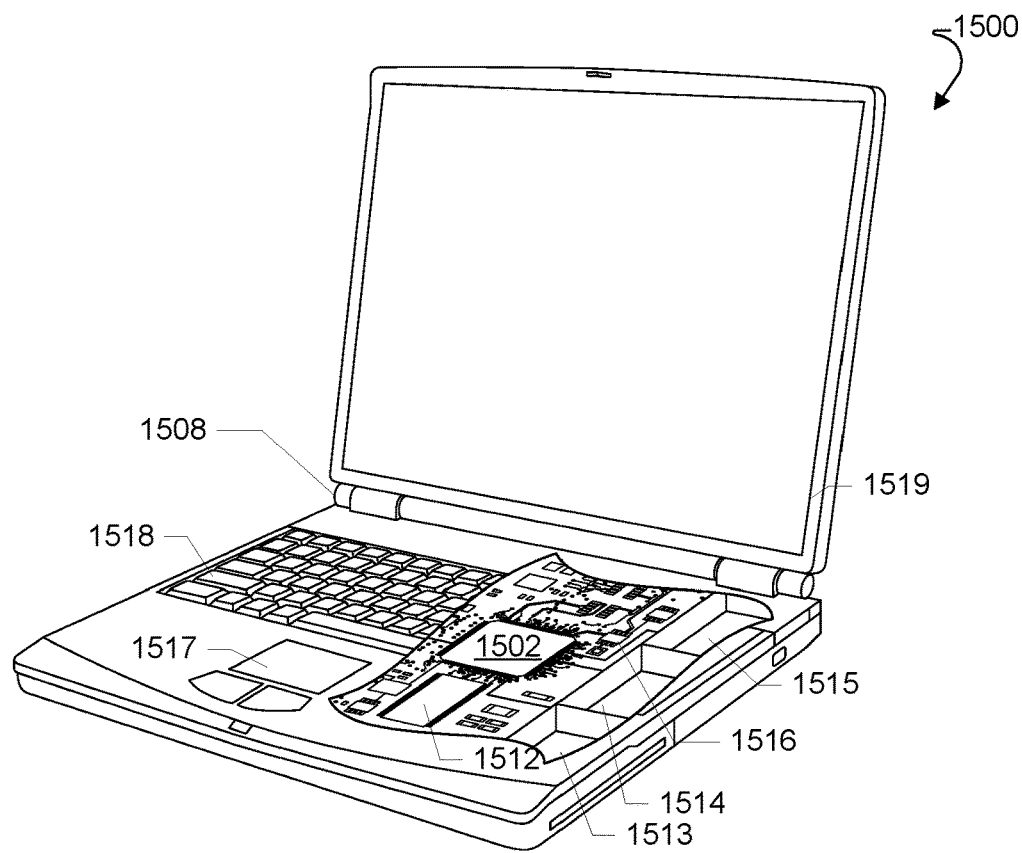
FIG. 15 is a component block diagram illustrating an example mobile computing device suitable for implementing a virtual cache coherency system in accordance with the various embodiments.

A virtual cache coherency system in accordance with the various embodiments (including, but not limited to, embodiments described above with reference to FIGS. 1-13C) may be implemented in a wide variety of computing systems include a laptop computer 1500 an example of which is illustrated in FIG. 15. Many laptop computers include a touchpad touch surface 1517 that serves as the computer's pointing device, and thus may receive drag, scroll, and flick gestures similar to those implemented on computing devices equipped with a touch screen display and described above. A laptop computer 1500 will typically include a processor 1502 coupled to volatile memory 1512 and a large capacity nonvolatile memory, such as a disk drive 1513 of Flash memory. Additionally, the computer 1500 may have one or more antenna 1508 for sending and receiving electromagnetic radiation that may be connected to a wireless data link and/or cellular telephone transceiver 1516 coupled to the processor 1502. The computer 1500 may also include a floppy disc drive 1514 and a compact disc (CD) drive 1515 coupled to the processor 1502. In a notebook configuration, the computer housing includes the touchpad 1517, the keyboard 1518, and the display 1519 all coupled to the processor 1502. Other configurations of the computing device may include a computer mouse or trackball coupled to the processor (e.g., via a USB input) as are well known, which may also be used in conjunction with the various embodiments.

Figure 16:
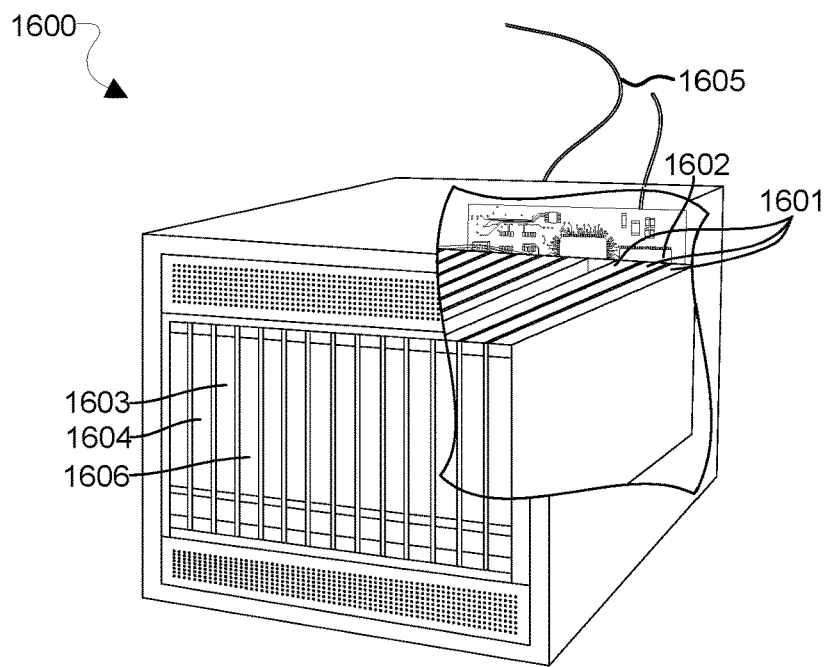
FIG. 16 is a component block diagram illustrating an example server suitable for implementing a virtual cache coherency system in accordance with the various embodiments.

A virtual cache coherency system in accordance with the various embodiments (including, but not limited to, embodiments described above with reference to FIGS. 1-13C) may also be implemented in fixed computing systems, such as any of a variety of commercially available servers. An example server 1600 is illustrated in FIG. 16. Such a server 1600 typically includes one or more multicore processor assemblies 1601 coupled to volatile memory 1602 and a large capacity nonvolatile memory, such as a disk drive 1604. As illustrated in FIG. 16, multicore processor assemblies 1601 may be added to the server 1600 by inserting them into the racks of the assembly. The server 1600 may also include a floppy disc drive, compact disc (CD) or digital versatile disc (DVD) disc drive 1606 coupled to the processor 1601. The server 1600 may also include network access ports 1603 coupled to the multicore processor assemblies 1601 for establishing network interface connections with a network 1605, such as a local area network coupled to other broadcast system computers and servers, the Internet, the public switched telephone network, and/or a cellular data network (e.g., CDMA, TDMA, GSM, PCS, 3G, 4G, LTE, 5G or any other type of cellular data network).

Computer program code or "program code" for execution on a programmable processor for carrying out operations of the various embodiments may be written in a high level programming language such as C, C++, C#, Smalltalk, Java, JavaScript, Visual Basic, a Structured Query Language (e.g., Transact-SQL), Perl, or in various other programming languages. Program code or programs stored on a computer readable storage medium as used in this application may refer to machine language code (such as object code) whose format is understandable by a processor.

The foregoing method descriptions and the process flow diagrams are provided merely as illustrative examples and are not intended to require or imply that the operations of the various embodiments must be performed in the order presented. As will be appreciated by one of skill in the art the order of operations in the foregoing embodiments may be performed in any order. Words such as "thereafter," "then," "next," etc. are not intended to limit the order of the operations; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm operations described in connection with the various embodiments may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the claims.

The hardware used to implement the various illustrative logics, logical blocks, modules, and circuits described in connection with the embodiments disclosed herein may be implemented or performed with a general purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more embodiments, the functions described may be implemented in hardware, software, firmware, or any combination thereof. If implemented in software, the functions may be stored as one or more instructions or code on a non-transitory computer-readable medium or a non-transitory processor-readable medium. The operations of a method or algorithm disclosed herein may be embodied in a processor-executable software module that may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments and implementations without departing from the scope of the claims. Thus, the present disclosure is not intended to be limited to the embodiments and implementations described herein, but is to be accorded the widest scope consistent with the following claims and the principles and novel features disclosed herein.

What is claimed is:

1. A method performed in a processor for virtual cache coherency, comprising:
    receiving a snoop for a physical address from a coherent processing device, wherein the snoop is associated with a type of snoop;
    receiving the physical address and a portion of a corresponding virtual address from a system memory management unit (SMMU);
    determining whether an entry for the physical address corresponding to the virtual address in a virtual cache exists in a snoop filter;
    determining a type of cache coherency operation based on the type of snoop;
    sending a cache coherency operation of the type of cache coherency operation to the virtual cache bypassing the SMMU in response to determining that the entry exists in the snoop filter;
    updating a counter of the entry configured to track a number of lines in the virtual cache having a location including the portion of the corresponding virtual address;
    determining whether the counter indicates that the there are no lines in the cache for the entry having a location including the portion of the corresponding virtual address; and
    removing the entry from the snoop filter in response to determining that the counter indicates that the there are no lines in the cache for the entry having a location including the portion of the corresponding virtual address.

2. The method of claim 1, further comprising:
    receiving the cache coherency operation; and
    implementing the cache coherency operation in the virtual cache.

3. The method of claim 2, further comprising:
    sending virtual cache location information for the cache coherency operation in response to determining that the entry exists in the snoop filter; and
    receiving virtual cache location information for the cache coherency operation,
    wherein implementing the cache coherency operation in the virtual cache comprises implementing the cache coherency operation in the virtual cache at locations corresponding with the virtual cache location information.

4. The method of claim 3, wherein the virtual cache location information is stored in the entry for the physical address in the snoop filter.

5. The method of claim 3, wherein the virtual cache location information is at least part of the physical address.

6. The method of claim 2, further comprising:
    receiving a release synchronization operation command;
    setting a synchronization status for a line in the virtual cache to need to flush in response to receiving the release synchronization operation command;
    determining whether the synchronization status for the line is set to need to flush; and
    determining whether the cache coherency operation is a flush operation,
    wherein implementing the cache coherency operation in the virtual cache comprises flushing the line in response to determining that the synchronization status for the line is set to need to flush and in response to determining that the cache coherency operation is a flush operation.

7. The method of claim 2, wherein:
    receiving the cache coherency operation comprises receiving an invalidate operation;
    the method further comprises:
        setting a synchronization status for a line in the virtual cache to need to flush in response to receiving the invalidate operation;
        receiving an acquire synchronization operation command; and
        determining whether the synchronization status for the line is set to need to invalidate; and
    implementing the cache coherency operation in the virtual cache comprises invalidating the line in response to receiving the acquire synchronization operation command and in response to determining that the synchronization status for the line is set to need to invalidate.

8. The method of claim 1, further comprising:
    setting a version identifier (ID) of the virtual cache for a type of cache coherency operation; and
    setting a version ID of a line of the virtual cache for a type of a cache coherency operation.

9. The method of claim 8, further comprising:
    receiving a synchronization operation; and
    determining a type of the synchronization operation,
    wherein setting a version ID of the virtual cache for a type of cache coherency operation comprises advancing the version ID for the virtual cache for a type of cache coherency operation based on the type of synchronization operation.

10. The method of claim 8, further comprising:
    receiving a cache coherency operation;
    determining a type of the cache coherency operation;
    determining whether the version ID for the line in the virtual cache is older than the version ID for the virtual cache;
    flushing the line in the virtual cache in response to determining that the type of the cache coherency operation is a flush operation and that the version ID for the line in the virtual cache is older than the virtual ID for the virtual cache; and
    determining whether the version ID for the line in the virtual cache is unset,
    wherein setting a version ID of a line of the virtual cache for a type of a cache coherency operation comprises setting the version ID for the line in the virtual cache to the version ID of the virtual cache in response to determining that the type of the cache coherency operation is an invalidate operation and that the version ID for the line in the virtual cache is unset.

11. The method of claim 8, further comprising:
    receiving a cache operation;
    determining a type of the cache operation;
    determining whether the version ID for the line in the virtual cache is older than the virtual ID for the virtual cache;
    missing and fetching data for the line in the virtual cache in response to determining that the type of the cache operation is a read operation and that the version ID for the line in the virtual cache is older than the virtual ID for the virtual cache; and
    determining whether the version ID for the line in the virtual cache is unset,
    wherein setting a version ID of a line of the virtual cache for a type of a cache coherency operation comprises setting the version ID for the line in the virtual cache to the version ID of the virtual cache in response to determining that the type of the cache operation is a write operation and that the version ID for the line in the virtual cache is unset.

12. A computing device configured for virtual cache coherency, comprising:
a processor configured with processor-executable instructions to perform operations comprising:
receiving a snoop for a physical address from a coherent processing device, wherein the snoop is associated with a type of snoop;
receiving the physical address and a portion of the corresponding virtual address from a system memory management unit (SMMU);
determining whether an entry for the physical address corresponding to the virtual address in a virtual cache exists in a snoop filter;
determining a type of cache coherency operation based on the type of snoop;
sending a cache coherency operation of the type of cache coherency operation to the virtual cache bypassing the SMMU in response to determining that the entry exists in the snoop filter;
updating a counter of the entry configured to track a number of lines in the virtual cache having a location including the portion of the corresponding virtual address;
determining whether the counter indicates that the there are no lines in the cache for the entry having a location including the portion of the corresponding virtual address; and
removing the entry from the snoop filter in response to determining that the counter indicates that the there are no lines in the cache for the entry having a location including the portion of the corresponding virtual address.

13. The computing device of claim 12, wherein the processing device is configured with processor-executable instructions to perform operations further comprising:
receiving the cache coherency operation; and
implementing the cache coherency operation in the virtual cache.

14. The computing device of claim 13, wherein the processing device is configured with processor-executable instructions to perform operations further comprising:
sending virtual cache location information for the cache coherency operation to the virtual cache in response to determining that the entry exists in the snoop filter; and
receiving virtual cache location information for the cache coherency operation at the virtual cache,
wherein the processing device is configured with processor-executable instructions to perform operations such that implementing the cache coherency operation in the virtual cache comprises implementing the cache coherency operation in the virtual cache at locations corresponding with the virtual cache location information.

15. The computing device of claim 14, wherein the processing device is configured with processor-executable instructions to perform operations such that the virtual cache location information is stored in the entry for the physical address in the snoop filter.

16. The computing device of claim 14, wherein the processing device is configured with processor-executable instructions to perform operations such that the virtual cache location information is at least part of the physical address.

17. The computing device of claim 13, wherein:
the processing device is configured with processor-executable instructions to perform operations further comprising:
receiving a release synchronization operation command;
setting a synchronization status for a line in the virtual cache to need to flush in response to receiving the release synchronization operation command;
determining whether the synchronization status for the line is set to need to flush; and
determining whether the cache coherency operation is a flush operation,
the processing device is configured with processor-executable instructions to perform operations such that implementing the cache coherency operation in the virtual cache comprises flushing the line in response to determining that the synchronization status for the line is set to need to flush and in response to determining that the cache coherency operation is a flush operation.

18. The computing device of claim 13, wherein:
the processing device is configured with processor-executable instructions to perform operations such that receiving the cache coherency operation comprises receiving an invalidate operation;
the processing device is configured with processor-executable instructions to perform operations further comprising:
setting a synchronization status for a line in the virtual cache to need to flush in response to receiving the invalidate operation;
receiving an acquire synchronization operation command; and
determining whether the synchronization status for the line is set to need to invalidate; and
the processing device is configured with processor-executable instructions to perform operations such that implementing the cache coherency operation in the virtual cache comprises invalidating the line in response to receiving the acquire synchronization operation command and in response to determining that the synchronization status for the line is set to need to invalidate.

19. The computing device of claim 12, wherein the processing device is configured with processor-executable instructions to perform operations further comprising:
setting a version identifier (ID) of the virtual cache for a type of cache coherency operation; and
setting a version ID of a line of the virtual cache for a type of a cache coherency operation.

20. The computing device of claim 19, wherein:
the processing device is configured with processor-executable instructions to perform operations further comprising:
receiving a synchronization operation; and
determining a type of the synchronization operation; and
the processing device is configured with processor-executable instructions to perform operations such that setting a version ID of the virtual cache for a type of cache coherency operation comprises advancing the version ID for the virtual cache for a type of cache coherency operation based on the type of synchronization operation.

21. The computing device of claim 19, wherein:
the processing device is configured with processor-executable instructions to perform operations further comprising:

receiving a cache coherency operation;
determining a type of the cache coherency operation;
determining whether the version ID for the line in the virtual cache is older than the version ID for the virtual cache;
flushing the line in the virtual cache in response to determining that the type of the cache coherency operation is a flush operation and that the version ID for the line in the virtual cache is older than the version ID for the virtual cache; and
determining whether the version ID for the line in the virtual cache is unset;

the processing device is configured with processor-executable instructions to perform operations such that setting a version ID of a line of the virtual cache for a type of a cache coherency operation comprises setting the version ID for the line in the virtual cache to the version ID of the virtual cache in response to determining that the type of the cache coherency operation is an invalidate operation and that the version ID for the line in the virtual cache is unset.

22. The computing device of claim 19, wherein:
the processing device is configured with processor-executable instructions to perform operations further comprising:
receiving a cache operation;
determining a type of the cache operation;
determining whether the version ID for the line in the virtual cache is older than the version ID for the virtual cache;
missing and fetching data for the line in the virtual cache in response to determining that the type of the cache operation is a read operation and that the version ID for the line in the virtual cache is older than the version ID for the virtual cache; and
determining whether the version ID for the line in the virtual cache is unset; and the processing device is configured with processor-executable instructions to perform operations such that setting a version ID of a line of the virtual cache for a type of a cache coherency operation comprises setting the version ID for the line in the virtual cache to the version ID of the virtual cache in response to determining that the type of the cache operation is a write operation and that the version ID for the line in the virtual cache is unset.

23. A computing device comprising:
means for receiving a snoop for a physical address from a coherent processing device, wherein the snoop is associated with a type of snoop;
means receiving the physical address and a portion of the corresponding virtual address from a system memory management unit (SMMU);
means for determining whether an entry for the physical address corresponding to the virtual address in a virtual cache exists in a snoop filter;
means for determining a type of cache coherency operation based on the type of snoop; and
means for sending a cache coherency operation of the type of cache coherency operation to the virtual cache bypassing the SMMU in response to determining that the entry exists in the snoop filter;
means for updating a counter of the entry configured to track a number of lines in the virtual cache having a location including the portion of the corresponding virtual address;
means for determining whether the counter indicates that the there are no lines in the cache for the entry having a location including the portion of the corresponding virtual address; and
means for removing the entry from the snoop filter in response to determining that the counter indicates that the there are no lines in the cache for the entry having a location including the portion of the corresponding virtual address.

24. A non-transitory processor-readable storage medium having stored thereon processor-executable instructions configured to cause a processing device of a computing device to perform operations comprising:
receiving a snoop for a physical address from a coherent processing device, wherein the snoop is associated with a type of snoop;
receiving the physical address and a portion of the corresponding virtual address from a system memory management unit (SMMU);
determining whether an entry for the physical address corresponding to the virtual address in a virtual cache exists in a snoop filter;
determining a type of cache coherency operation based on the type of snoop; and
sending a cache coherency operation of the type of cache coherency operation to the virtual cache bypassing the SMMU in response to determining that the entry exists in the snoop filter;
updating a counter of the entry configured to track a number of lines in the virtual cache having a location including the portion of the corresponding virtual address;
determining whether the counter indicates that the there are no lines in the cache for the entry having a location including the portion of the corresponding virtual address; and
removing the entry from the snoop filter in response to determining that the counter indicates that the there are no lines in the cache for the entry having a location including the portion of the corresponding virtual address.

25. The non-transitory processor-readable storage medium of claim 24, wherein the stored processor-executable instructions are configured to cause the processing device of the computing device to perform operations further comprising:
receiving the cache coherency operation; and
implementing the cache coherency operation in the virtual cache.

26. The non-transitory processor-readable storage medium of claim 25, wherein:
the stored processor-executable instructions are configured to cause the processing device of the computing device to perform operations further comprising:
sending virtual cache location information for the cache coherency operation to the virtual cache in response to determining that the entry exists in the snoop filter; and
receiving virtual cache location information for the cache coherency operation at the virtual cache; and
the stored processor-executable instructions are configured to cause the processing device of the computing device to perform operations such that implementing the cache coherency operation in the virtual cache comprises implementing the cache coherency operation in the virtual cache at locations corresponding with the virtual cache location information.

27. The non-transitory processor-readable storage medium of claim 25, wherein:

the stored processor-executable instructions are configured to cause the processing device of the computing device to perform operations further comprising:

receiving a release synchronization operation command;

setting a synchronization status for a line in the virtual cache to need to flush in response to receiving the release synchronization operation command;

determining whether the synchronization status for the line is set to need to flush; and determining whether the cache coherency operation is a flush operation; and the stored processor-executable instructions are configured to cause the processing device of the computing device to perform operations such that implementing the cache coherency operation in the virtual cache comprises flushing the line in response to determining that the synchronization status for the line is set to need to flush and in response to determining that the cache coherency operation is a flush operation.

28. The non-transitory processor-readable storage medium of claim 25, wherein:

the stored processor-executable instructions are configured to cause the processing device of the computing device to perform operations such that receiving the cache coherency operation comprises receiving an invalidate operation;

the stored processor-executable instructions are configured to cause the processing device of the computing device to perform operations further comprising:

setting a synchronization status for a line in the virtual cache to need to flush in response to receiving the invalidate operation;

receiving an acquire synchronization operation command; and determining whether the synchronization status for the line is set to need to invalidate; and the stored processor-executable instructions are configured to cause the processing device of the computing device to perform operations such that implementing the cache coherency operation in the virtual cache comprises invalidating the line in response to receiving the acquire synchronization operation command and in response to determining that the synchronization status for the line is set to need to invalidate.

* * * * *